US009352501B2

(12) United States Patent
Stone

(10) Patent No.: US 9,352,501 B2
(45) Date of Patent: May 31, 2016

(54) MOLDING SYSTEMS AND METHODS

(71) Applicant: Ashley Stone, Schwerin (DE)

(72) Inventor: Ashley Stone, Schwerin (DE)

(*) Notice: Subject to any disclaimer, the term of this patent is extended or adjusted under 35 U.S.C. 154(b) by 39 days.

(21) Appl. No.: 14/244,467

(22) Filed: Apr. 3, 2014

(65) Prior Publication Data

US 2014/0367892 A1  Dec. 18, 2014

Related U.S. Application Data

(60) Provisional application No. 61/835,914, filed on Jun. 17, 2013.

(51) Int. Cl.
*B29C 45/74* (2006.01)
*B29C 45/28* (2006.01)

(52) U.S. Cl.
CPC ....... *B29C 45/281* (2013.01); *B29C 2045/2824* (2013.01); *B29C 2945/76505* (2013.01); *B29C 2945/76568* (2013.01); *B29C 2945/76749* (2013.01); *B29C 2945/76755* (2013.01)

(58) Field of Classification Search
CPC ....... B29C 45/2803–2045/2893; B29C 45/231
See application file for complete search history.

(56) References Cited

U.S. PATENT DOCUMENTS

| | | |
|---|---|---|
| 3,873,656 A | 3/1975 | Garner |
| 4,268,240 A | 5/1981 | Rees et al. |
| 4,412,807 A | 11/1983 | York |
| 4,925,384 A | 5/1990 | Männer |
| 5,499,916 A | 3/1996 | Schad et al. |
| 5,556,582 A | 9/1996 | Kazmer |
| 5,948,448 A | 9/1999 | Schmidt |
| 6,086,357 A | 7/2000 | Steil et al. |
| 6,194,796 B1 | 2/2001 | Yeakley et al. |
| 6,294,122 B1 | 9/2001 | Moss et al. |
| 6,343,921 B1 | 2/2002 | Kazmer et al. |
| 6,894,408 B2 | 5/2005 | Godkin |
| 7,044,728 B2 | 5/2006 | Schunck et al. |
| 7,121,820 B2 | 10/2006 | Tooman et al. |
| 7,275,923 B2 | 10/2007 | Tooman et al. |
| 7,341,445 B2 | 3/2008 | Paris et al. |
| 7,501,834 B2 | 3/2009 | Madini et al. |
| 7,588,436 B2 | 9/2009 | Tooman et al. |

(Continued)

FOREIGN PATENT DOCUMENTS

| | | |
|---|---|---|
| DE | 19956215 A1 | 9/2003 |
| DE | 202006008988 U1 | 10/2007 |

(Continued)

OTHER PUBLICATIONS

U.S. Appl. No. 61/835,914, filed Jun. 17, 2013.

(Continued)

*Primary Examiner* — Jill Heitbrink

(57) ABSTRACT

A hot-runner system, comprising: a melt flow modular assembly having a gate melt flow control apparatus; and a Lorentz force actuator assembly being coupled to the gate melt flow control apparatus. A valve gate drive controller for control of the Lorentz force actuator assembly of the hot-runner system. An injection plastic molding apparatus devised to mold plastic articles, and the injection plastic molding apparatus having the hot-runner system. A method comprising operating the Lorentz force actuator assembly of the hot-runner system. A melt flow modular assembly for use with the Lorentz force actuator assembly of the hot-runner system.

30 Claims, 15 Drawing Sheets

(56) References Cited

U.S. PATENT DOCUMENTS

| | | | |
|---|---|---|---|
| 7,600,995 | B2 | 10/2009 | Baumann et al. |
| 7,766,647 | B2 | 8/2010 | Dewar et al. |
| 7,841,855 | B2 | 11/2010 | Gunther et al. |
| 7,845,925 | B2 | 12/2010 | Tooman et al. |
| 7,847,661 | B2 | 12/2010 | Jotter et al. |
| 7,876,001 | B2 | 1/2011 | Knorr |
| 7,901,601 | B2 | 3/2011 | Vasapoli et al. |
| 7,934,918 | B2 | 5/2011 | Selak et al. |
| 8,047,826 | B2 | 11/2011 | Kimura |
| 8,192,191 | B2 | 6/2012 | Tooman et al. |
| 8,228,149 | B2 | 7/2012 | Puth et al. |
| 8,363,881 | B2 | 1/2013 | Godkin |
| 8,368,255 | B2 | 2/2013 | Park et al. |
| 2005/0100625 | A1 | 5/2005 | Tooman et al. |
| 2007/0065538 | A1 | 3/2007 | Weatherall et al. |
| 2007/0290406 | A1* | 12/2007 | Kaushal et al. ............ 264/328.8 |
| 2008/0290972 | A1* | 11/2008 | Jotter et al. .................. 335/229 |
| 2011/0117238 | A1 | 5/2011 | Gunther et al. |
| 2011/0293761 | A1 | 12/2011 | Hontheim et al. |
| 2012/0008221 | A1 | 1/2012 | Min et al. |
| 2012/0248652 | A1 | 10/2012 | Galati et al. |
| 2013/0087950 | A1 | 4/2013 | Gunther et al. |
| 2013/0216644 | A1 | 8/2013 | Sommer et al. |
| 2013/0309348 | A1 | 11/2013 | Gunter et al. |
| 2014/0367892 | A1 | 12/2014 | Stone |

FOREIGN PATENT DOCUMENTS

| | | | |
|---|---|---|---|
| DE | 102012103839 A1 | 11/2013 | |
| DE | 102012213052 A1 | 5/2014 | |
| EP | 0587841 A1 | 3/1994 | |
| EP | 0967063 A1 | 12/1999 | |
| EP | 1336464 A1 | 8/2003 | |
| EP | 0920970 B1 | 11/2003 | |
| EP | 2303539 A2 | 4/2011 | |
| EP | 2487022 A2 | 8/2012 | |
| EP | 2080415 B1 | 12/2012 | |
| GB | 872101 | 7/1961 | |
| WO | 2013127524 A1 | 9/2013 | |

OTHER PUBLICATIONS

Keitel, Ralph; Electricity or Air? A Comparison of Needle Valve Systems; Manner Solutions for Plastics; www.kunststoffe-international.com; PE110895; Kunststoffe International; Nov. 2011; pp. 28-30.

Plastic Engineering & Technical Services, Inc.; P.E.T.S® Electrical Valve Gate Hot Runner Solutions From DME; http://moldtooling.com/wwwdme/tech/PETS%20EVG%20HOt%20Runner.pdf; retrieved from the Internet Dec. 1, 2014.

Anonymous, "Wie funktioniert ein Elektromotor? Genius—Wissenscommunity", http://www.cedysworld.de, (Feb. 16, 2011), URL:http://www.cedysworld.de/artikel/wie-funktioniert-ein-elektromotor, (Jul. 23, 2015), p. 1.

Anonymous, "Linear motor—Wikipedia, the free encyclopedia", wikipedia, (Aug. 25, 2013), URL:https://en.wikipedia.org/w/index.php?title=Linear_motor&oldid=570183942, (Jul. 23, 2015), p. 1.

Kazmer D.O. et al, "Polymer Injection Molding Technology For The Next Millennium: A Vision To The Future", Journal Of Injection Molding Technology, Society Of Plastics Engineers, Brookfield, CT, US, (Jun. 1, 1997), vol. 1, No. 2, ISSN 1533-905X, p. 81-90, 19-20 p. 87, c. r, fig. 3.

European Search Report issued in correspond EP Patent No. EP14196396; search completed Jan. 22, 2016.

* cited by examiner

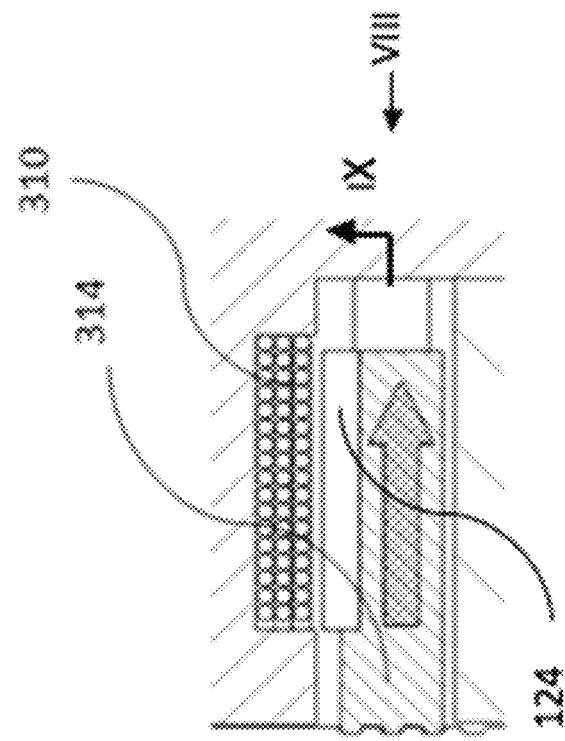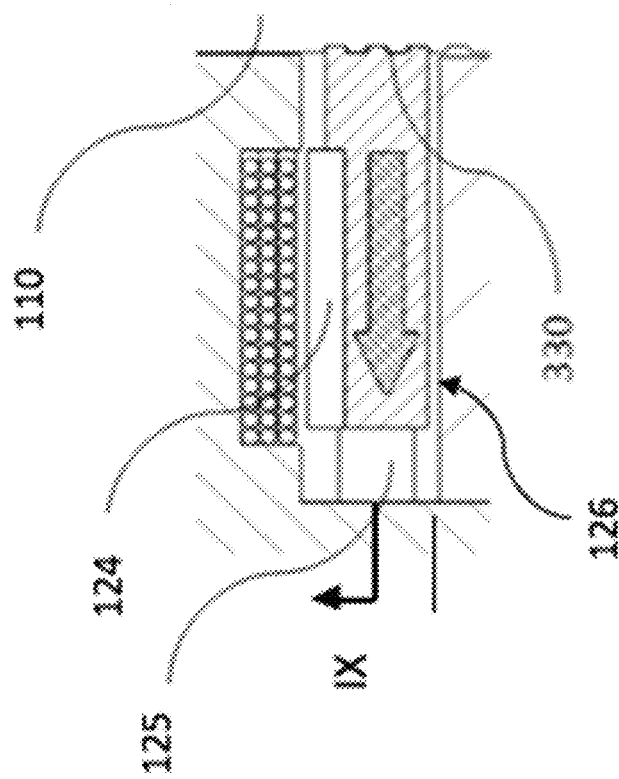
FIG. 7

MOLDING SYSTEMS AND METHODS

CROSS-REFERENCE TO RELATED APPLICATIONS

This application claims priority from U.S. Provisional Application No. 61/835,914 filed Jun. 17, 2013; the entire contents of which is incorporated herein by reference.

TECHNICAL FIELD

The present invention relates to molding systems and methods, more specifically, to a hot-runner system, a melt flow modular assembly, an injection molding method, an injection mold, hot runner, and a valve gate device.

BACKGROUND

Injection molding (British English: moulding) is a manufacturing process for producing parts from both thermoplastic and thermosetting plastic or other materials, including metals, glasses, elastomers and confections. Material is fed into a heated barrel, mixed, and forced into a mold cavity where it cools and hardens to the configuration of the cavity. After a product is designed, usually by an industrial designer or an engineer, molds are made by a mold maker (or toolmaker) from metal, usually either steel or aluminum, and precision-machined to form the features of the desired part. Injection molding is widely used for manufacturing a variety of parts, from the smallest component to entire body panels of cars.

Injection molding utilizes a ram or screw-type plunger to force molten plastic material into a mold cavity; this produces a solid or open-ended shape that has conformed to the contour of the mold. It is most commonly used to process both thermoplastic and thermosetting polymers, with the former being considerably more prolific in terms of annual material volumes processed.

Thermoplastics are prevalent due to characteristics which make them highly suitable for injection molding, such as the ease with which they may be recycled, their versatility allowing them to be used in a wide variety of applications, and their ability to soften and flow upon heating.

Injection molding consists of high-pressure injection of the molten plastics material, referred to as plastic melt, into a mold, which shapes or forms the polymer into a desired shape. Molds can be of a single cavity or multiple cavities. In multiple cavity molds, each cavity can be identical and form the same parts or can differ and produce multiple different geometries during a single cycle. Molds are generally made from tool steels, but stainless steels and aluminum molds are suitable for certain applications.

Aluminum molds typically are ill-suited for high-volume production or parts with narrow dimensional tolerances, as they have inferior mechanical properties and are more prone to wear, damage, and deformation during injection and clamping cycles; however, they are more cost-effective in low volume applications as mold fabrication costs and time are considerably reduced. Many steel molds are designed to process well over a million parts during their lifetime and can cost hundreds of thousands of dollars to fabricate.

When thermoplastics are molded, typically pelletized raw material is fed through a hopper into a heated barrel with a feed screw. Upon entrance to the barrel, the thermal energy increases and the Van der Waals forces that resist the relative flow of individual chains are weakened as a result of increased space between molecules at higher thermal energy states. This reduces its viscosity, which enables the polymer to flow under the influence of the driving force of the injection unit. The feed screw, typically an Archimedean screw, delivers the raw material forward, mixes and homogenizes the thermal and viscous distributions of the polymer, and reduces the required heating time by mechanical shearing of the material and adding a significant amount of frictional heating to the polymer. The material is fed forward through a check valve and collects at the front of the screw into a volume known as a shot. The shot is the volume of material, which is used to fill the mold cavity, compensate for shrinkage, and provide a cushion (approximately 10% of the total shot volume which remains in the barrel and prevents the screw from bottoming out) to transfer pressure from the screw to the mold cavity. When enough material has gathered, the material is forced at high pressure and velocity through a gate and into the part-forming cavity by moving the screw along its axis. To prevent spikes in pressure, the process normally utilizes a transfer position corresponding to a 95-98% full cavity where the screw shifts from a constant velocity to a constant pressure control. Often injection times are well under one second and the cooling time of the part in excess of four seconds. Once the screw reaches the transfer position the packing pressure is applied, which completes mold filling and compensates for thermal shrinkage, which is quite high for thermoplastics relative to many other materials. In thermal gating the packing pressure is applied until the material located in the mold gate (cavity entrance) solidifies. The gate is normally the first place to solidify through its entire thickness due to its small size. Once the gate solidifies, no more material can enter the cavity; accordingly, the screw returns and acquires material for the next cycle while the material within the mold cools so that it can be ejected and be dimensionally stable. This cooling duration is dramatically reduced using cooling lines to circulate water or oil from a thermolator or preferably using an organic refrigerant. Once the required temperature has been achieved, the mold opens and an array of pins, ejectors, etc. is driven forward to remove the article from the mold, referred to a "de-molding". Then, the mold closes and the process is repeated. The thermal gating, where the closing of the gate is accomplished by solidified plastic, is possible for small flow requirements with a melt flow channel with small gates. For high plastic flow rates, a valve gated hot runner is used in which mechanical valves control the flow of melt from a common supply, or hot runner, to the mold. A modulating assembly modulates the melt flow. Faster cycle time may be attained because no gate cooling is required to shut off the melt flow, and no gate re-heating is required to open the gate to the melt flow.

A parting line, sprue, gate marks, valve pin marks, and ejector pin marks are usually present on the final part, often even after prolonged cooling time. None of these features are typically desired, but are unavoidable due to the nature of the process. Gate marks occur at the gate that joins the melt-delivery channels (sprue and runner) to the part-forming cavity. Parting line and ejector pin marks result from minute misalignments. The wear, gaseous vents, clearances for adjacent parts in relative motion, and/or dimensional differences of the mating surfaces contacting the injected polymer also create marks on the molded surface of the part. The dimensional differences can be attributed to non-uniform, pressure-induced deformation during injection, machining tolerances, and non-uniform thermal expansion and contraction of mold components, which experience rapid cycling during the injection, packing, cooling, and ejection phases of the process. Mold components are often designed with materials of various coefficients of thermal expansion. These factors cannot be simultaneously accounted for, without astronomical increases in the cost of design, fabrication, processing, and the part quality monitoring. The skillful mold and part designers, will position these aesthetic detriments in hidden areas, if feasible.

Inevitably, to eliminate the gate marks, it is necessary to improve gate performance. The gate marks and gate residuals are called vestige. The molding quality is directly apportioned to shape, configuration, degradation of the vestige and vestige height and shape. The gate quality is nowadays-major issue in injection molding art, particularly for food and beverage packaging.

It is well-known in the field of injection molding art that some structure must be placed in the mold gate, at a particular time in the molding cycle, to inhibit the flow of molten material into the cavity of a mold, so that the molded part may be cooled, and subsequently opened to remove the molded parts. This must be done without creating drool of the molten material in the molding surface. This drool would create undesirable marks on the next moldings, and this is largely unacceptable.

As noted above, there are essentially two broad categories of melt flow modulating assemblies, or flow inhibiting techniques known in the field of injection molds, namely, thermal gating in which the gate at the exit of the nozzle is rapidly cooled at the completion of the injection operation to form a solid or semi-solid plug of the material being injected into the gate; and valve gating in which a mechanical means is employed to inhibit the flow of material being injected into the mold cavity.

Each category has its own advantages and disadvantages relative to the other. Numerous systems using thermal gating are known in the art of the hot-runners.

Valve gating systems are generally of one of two types, namely inline and lateral systems of gate closing. A wide variety of systems of each type have been developed. Referring now to the inline gating choices, there is in the art of the injection molding, mainly three types of valve gate closing choices: axial pin motion, rotary pin motion with shutoff, and a rotary pin with dynamic melt flow control without positive shutoff.

Many valve mechanisms used in the injection molding industry are constructed in such a way as to move a valve pin assembly in an axial direction along the nozzle melt channel from fully open to fully closed position. This is the predominant structure when comparing based on the motion of the valve pin.

An example of this is found in U.S. Pat. No. 4,268,240, U.S. Pat. No. 6,086,357, U.S. Patent publication No. 2011/0293761 A1, U.S. Pat. No. 8,047,836 B2, U.S. Pat. No. 7,600, 995 B2, or for example, U.S. Pat. No. 7,044,728 B2 and U.S. Patent publication No. 2005/0100625 A1 where the plastic is transferred from a hot-runner manifold to a nozzle. This type of the melt delivery goes around the pin and then rejoins the melts from each side of the pin, and reconstitutes the tubular flow just below the valve pin tip. Therefore, this kind of the valve pin motion, being axial, causes melt flow, arriving laterally at the pin, to be divided by the valve pin or stem.

The flow is rejoined again into a single path as it passes in to the mold cavity, resulting in moldings with undesirable weld lines created by the once divided polymer volumes, visibly affecting quality of the products. These weld lines can adversely affect both the aesthetic and performance qualities of the final molded product, and it is significantly advantageous to avoid their creation when molding certain products.

Some alternatives to prevent melt separation have been proposed, e.g. the valve pin may be shielded, as in U.S. Pat. No. 4,412,807 which shows an apparatus in which the plastic flow channel in the nozzle is kept separate from the valve pin in an effort to avoid dividing the melt stream. The channel is a crescent shaped cross section, which is known to be less than ideal for encouraging plastic flow, especially in the opposing sharp corners. Furthermore, when the valve pin is in the open position to let plastic material to pass into the mold cavity, it creates a stagnant area of poor plastic flow directly adjacent the front face of the pin. These areas of poor plastic flow can result in material degradation, which can adversely affect the performance and physical properties of the molded product.

U.S. Pat. No. 4,925,384 shows a similar design that permits the plastic to come into contact with the valve pin but restricts it from passing around the pin to form a weld line. This patent describes an approach that does not cause pronounced division of the melt flow. This design also suffers from a melt channel with sluggish flow areas and requires difficult and expensive machining processes to produce the nozzle housing, having an unusual melt channel cross section.

Alternatively, valve gates may be structured to rotate the pin and close or open the gate that way.

U.S. Pat. No. 3,873,656 shows a valve having taps, which rotate to open or close. This is similar to the approach described above. It is not compact or easy to manufacture and has sharp edges, susceptible to damage, where it mates with the sprue channels.

A rotating nozzle is shown in U.K. Patent No. 872,101. The entire injection unit nozzle rotates on an axis parallel to the flow of plastic as opposed to the perpendicular or angular rotation axis of the two patents mentioned previously. The nozzle front portion remains in forced contact with the delivery bushing, to prevent plastic leakage between the two. The construction shown is very bulky, consuming a substantial amount of space.

Further example of the attempt to reduce weld line and part marks is disclosed in the U.S. Pat. No. 5,499,916 where the stem rotates with limited contact with the melt flow but does not allow melt separation.

A further example to improve melt flow delivery, and melt flow temperature uniformity as well as hot runner balancing is attempted in the application of the rotating pin is disclosed in U.S. Patent Publication No. 2007/0065538 A1. The valve pin is operatively connected to a motor that has fast acceleration and deceleration rates. The valve pin is made in the form of an Archimedean screw or screw pump so that the pin is positioned within the melt flow assembly in the hot-runner nozzle. By rotating and pumping melt flow in the direction of the melt flow, the valve-pin "pump" reduces pressure drop within the melt flow assembly, supposable creating favorable melt delivery and melt conditioning.

However, when rotation is in the direction to retard melt flow of the molten material traveling in the direction of the cavity, higher-pressure drop is created in the melt flow assembly of the hot-runner and therefore, balancing the pressure and flow to ensure that drop-to-drop uniformity is maintained. Besides the positive effect on the uniformity of the melt, that is critical for food packaging and medical parts, this valve gate molding system can effectively produce acceptable quality gate vestige mark and at the same time ensure that the closing of the gate is accomplished by rotation of the pin screw "pump" within melt in the melt flow assembly and at the same time improve temperature uniformity of the melt in the hot-runner nozzle.

In each of the systems described above, and in inline systems, generally, a valve pin aligned with the gate is moved parallel to the direction of movement of molten material (generally referred to as "melt") through the gate, between a position wherein the pin extends into the gate to block flow through the gate, and a position wherein the pin is retracted from the gate permitting flow there-through into the mold cavity. In order to be aligned with the gate, the valve pin is located inside the injection nozzle and is at least partially within the flow path of the melt.

For these and other reasons, inline valve gating suffers from a variety of problems.

One common problem is wear of the valve pin due to contact with the nozzle and/or gate, which can lead to leaks or failure of the valve.

Another common problem is the conversion of the melt from the tubular flow entering the nozzle to an annular (or other non-continuous) flow, which is caused by the valve pin or other related components being within the melt flow. Such a non-continuous flow can result in weld or knot lines in the molded product produced as the melt flow recombines within the gate or mold cavity, and this can result in weakened or unacceptable molded products. This is particularly a problem when molding preforms for water containers where good part appearance and gate quality are an essential for successful sales of bottled water or other clear liquids.

The water bottles are made in a two-stage process and, require in a first stage to produce a preform, and in a second-stage the preform is air inflated against a cavity of the mold in a shape of the bottle. The bottle preforms are made from the polyethylene terephthalate, abbreviated as PET. The PET preform molding process, in particular, requires tubular melt flow, and having the pin inside the melt flow, does not help improve melt flow in the molding process.

During the injection process, the molten plastic material is injected into the mold cavity under very high pressure, often above 15,000 PSI. Once injected, in a short injection time, often less than one second, molten plastic enters cooling and solidification phase lasting 2 to 30 seconds. During this process, a definite time is selected, within hold time in the process, when to close the valve gate. Closing valve gate means that gate volume should be filled by pin tip volume so as to block plastic flow through the gate.

The axial movement of the valve pin assembly accomplishes this.

In principle, the valve pin conical surface and gate conical surface each have a complementary sealing surface. When these surfaces are brought together the flow of the material through the gate stops.

Usually, as it is well recognized in the injection molding art, the gate closing is initiated just about when the cavity is filled, and the injection time hold interval is about to end. After the valve pin is fully forward and in a predominantly closed position, no more plastic melt is possible to enter the cavity. Mold cooling helps to remove heat from the molded part and helps to solidify the part and cool it so that can be handled in post molding cooling process. The post molding process, by itself is the complex process when molding PET preforms or any food packaging containers like K-cups. The post molding process often requires specialty equipment and additional complexities.

The valve pin stays closed until the mold is fully open and perhaps even just before mold fully closed position after ejection of the molded part. Of course, timing when to start opening the valve gate is largely dependent on the valve pin driving apparatus.

Fast acting valve gate systems allow for more flexibility and better timing and control of the gate mechanism. Currently air piston operated valve gates require closing time up to one second due to lack of proportionality between air pressure and axial force. Once air piston start moving it only stops at the hard stop at the end of the stroke. Similarly, servo motor driven pins, introduce nonlinearity largely because gear box and nonlinearities in magnetic structures of the current servo motors and drives.

As noted above, there are various options for the valve gate pin configuration and ways for opening and closing the gate. There are, however, only a few options for powering the valve pins. It is known in the art of injection molding and hot runners to provide an electrical or fluid actuator to power the pin of the valve gate.

The electric motors, air motors or hydraulic motors mostly power the rotary pins. For axially moving valve pin, typically, the actuators are the pneumatic or hydraulic type. The moving air piston type actuator is predominantly used today to power axially moving valve gate pin due to its simplicity and compactness. All other motors, including servo motors and drives require conversion of rotary to linear motion via transmission elements or gearbox.

The disadvantage of using an air piston cylinder to power the valve gate assembly, besides extensive drilling of the substantial number of air channels, is that the pneumatic piston actuator may require specialized valves and air hoses to deliver and control the compressed air. The pressure of the air supply in each location is different and is very difficult to ensure consistent high air pressure at each valve pin location. Even when air pressure is available, often in range 75 PSI (pounds per square inch) to 120 PSI, flow rate, cleanliness and capacity of the air compressors may not be always adequate. Often just differences in hose length will change the mold performance due to different air supply pressure seen by each valve gate. Just the fact that the piston seal stiction alone, in the multi cavity mold, may be different at different operating temperatures is material and illustrates the level of randomness involved in these systems. The mechanical tolerance, location in the mold, air supply line arrangements, and environmental contamination, maybe enough to result in less than an optimal valve gate opening or closing time. These and other variations result in differences in part quality and quality of the gate vestige. These and other variations are not desirable.

Yet another disadvantage of the air operated valve gates is that the pin can only be positioned at the fully open position or at the fully closed position, and cannot be positioned between these two positions, unless additional pistons or complexities are installed. Moreover, as the compressed air temperature varies during the day, this inhibits molding good parts without continuous process adjustments and monitoring. A further disadvantage of the air piston operated valve gates is that they are relatively easy to get contaminated by the PET dust or air impurities and then get slow to move and not very accurate in the closing position of the pin.

A further disadvantage is that the air exhaust contaminates freshly molded parts, and parts for medical and food packaging industry are very sensitive to parts cleanliness.

The most important disadvantage of the air operated valve gate systems is that air is exhausted to the environment and large volume of air is used for these operations. Compressing and delivering air to the molding system is very expensive and compressed air is delivered with overall compressor efficiency less than 40%. That means only a portion of the electrical energy used for compressing and delivering compressed air is used and converted into a useful motion of the valve pin.

Hydraulic pistons are often used for large valve gated assemblies and relatively high axial force requirements, but using hydraulic oil and mist in the vicinity of freshly molded medical or food packaging parts, is not acceptable.

Electric motors with rotary motion are being used for generating axial motion.

The motors and gear transmission assemblies are very large in volume and mostly not suitable for applications with a higher number of cavities.

In some applications, like food packaging and medical molding industry, the use of the electric actuators for the valve gates is demanded due to their cleanliness. Air and hydraulics just generate too much of the air contaminant dispersion to be acceptable in clean environments like medical moldings and food packaging.

Electrical actuators are becoming more compact and being now available in a variety of the configurations, which allows them to be used as actuators for the valve gate assemblies in injection molding systems.

One example of such an electrically operated valve gate pin is disclosed in the U.S. Patent Publication No. 2005/0100625 A1. In that patent, a valve gate assembly for regulating a flow of molten material into a mold is operated by the electric motor. The electric motor operates via a mechanical transmission to move the valve pin, and infinitely positions the valve pin between the fully closed position and the fully open position by using a position feedback device in a closed loop servo control mode. Various electric motors are proposed for this application, but servo controls of this nature are largely impractical for high cavitation molds where 96 to 144 individual PET preforms may be molded within each machine cycle. Besides, a feedback device installed for each individual pin position feedback is impractical and very difficult to integrate in the molds and hot runner assemblies. Even if, and when used, the closed-loop servo motor powered valve pin, must maintain the valve pin in a closed position when the operator's gate is open to prevent hot plastic melt spray and injury to operators entering the mold area. The servomotor must maintain positioning accuracy and stiffness throughout the injection cycle, and that means high current is required to just maintain the position. Motors must be rated for 100% duty cycle. It is easy to see how overheating of the electric motor can occur, and then additional complexities must be built into a servo system to overcome that. Molders today just are not ready to put up with maintenance and servicing requirements of hundreds of the individually controlled servo motor systems, despite the valve pin positioning accuracy and associated benefits of the accurate individual valve pin positioning.

U.S. Pat. No. 5,556,582 describes the system wherein an adjustable valve pin is operated by the servo controlled motor. The valve pin can be dynamically adjusted by a computer according to pressure data read at or near the injection gate. If multiple valves are used, each is independently controlled. A hot runner nozzle is not provided. Also, as the system is used, the repetitive actions of the valve pin cause significant wear on the tip of the valve pin. This wear, is a result of the repeated impact with the mold cavity. Basically, an adjustable valve is provided that is adjusted by the close loop servo system, while the plastic melt material is flowing through the gate into the mold cavity. The computer controls the servo motor, based on a sensor in the cavity, preferably stated as being cavity pressure closed loop servo system. This control is complex and not easy to implement in large cavitation molds.

U.S. Pat. No. 6,294,122 B1 describes the system of driving the pin axially along the nozzle melt channel in a closed-loop control by operatively connecting the pin with linearly moving mechanical transmission assembly, which converts the rotational movement of the motor assembly into linear motion. The conversion assembly is a gearbox or screw and a nut threadingly engaged with each other or alternatively driven by the rack and pinion gear assembly. Positioning is based on the proportional integral and derivative (PID) controls getting position feedback from an encoder. This approach, while sophisticated and allowing for very precise valve pin positioning, is complex and overly sophisticated for the applications and the current state of the art in the plastic industry today. Besides, having transmission elements between an electrical rotor and vale pin introduces unacceptable response delay. The motor gear assembly use is therefore limited to large molds often used in automotive applications where fast pin closing moves are not required. Besides, having bulky motor and a gearbox between the molding platens of the injection machine limits the opening stroke and type of the parts that can be molded with this arrangement. Again this is generally not practical for high cavitation counts and high production rates.

In a similar attempt to operate a valve pin with a clean electrical motor and accommodate a large number of drops, U.S. Patent Publication No. 2011/0293761 A1 describes a system where a plurality of pins is attached to an electromagnetically driven plate so the valve pins are movable responsive to movement of the actuation plate. No proposed driving logic is offered as to how to control the largely uncontrollable force at the end of the stroke. When two magnetic assemblies of the type shown in this published application get very close together, the impact and noise generated by the plate contact is likely to damage connecting elements of the valve pin if not mitigated with additional complexities. It would also likely result in a very slow movement of the valve pin assembly because it would take substantial time to establish a magnetic field in a large magnetic storage like electromagnets, and to subsequently reverse that field. To collapse the electromagnetic field in assemblies of this size is a lengthy and involved process, even when sophisticated electronic devices are used. The magnetic structures of this size and mass do not allow for fast current switching, because the collapsing magnetic field and changing polarity will generate back electromotive force of significant proportions. Simply, a large mass does not lend itself for fast opening and closing valve pins.

At the opposite spectrum of valve pin actuations, small electromagnetic actuators have been proposed and tested. The most promising method of direct pin activation is the method of controlling pin closed and pin open position with two solenoids but aided by a spring: one to hold the valve open and one to hold the valve closed. Since the electromagnetic solenoid actuators are inherently unidirectional and a large force is required at the end of the stroke, it is very difficult to electronically control the movement of the pin.

Also the force exerted by these solenoid actuators is proportional to the square of the current input, and decreases as the function of the air gap between the actuator and the armature. Therefore, as good as these actuators are, their control is difficult for consistent operation. Having a mechanical spring is also an undesirable feature.

It is critical for the valve pin to arrive exactly at the end of the stroke with exactly near zero velocity. This is often defined in state of the art as perfect "soft landing". The receiving end actuator must do exactly as much work as was done against friction and adhesive force of the melt along the entire transition from open-to-close or vice versa. If the actuator does not do this much work, the valve pin will stop before the end of the stroke. If the actuator does any more than the exact correct work, the valve pin arrives at the end of the stroke with non-zero velocity where it can impact valve seat if contacts it, or imparts the shock and vibration on the valve pin assembly by impacting against a hard stop. The non-uniform force, and other effects cause disturbances of the valve pin assembly and make this system very difficult to control.

None of the foregoing valve pin activation and control techniques offer individually controlled valve pin structure in a small and compact size that will move the pin axially along the melt flow channel, without any interconnecting, converting mechanical transmission elements to reduce speed, or convert power or convert torque. These and other systems require installation of the position or process feedback devices in areas that has limited space. The mechanical structures have very small structural safety margins, and any additional requirements for installation of any feedback devices make the systems very complex. This is particularly difficult in applications with an increased number of cavity drops and reduced drop to drop (pitch) spacing.

It is therefore an object to the present invention to obviate or mitigate the above disadvantages.

SUMMARY

In an aspect of this invention, an injection plastic molding method and apparatus are disclosed having an electrical force actuator assembly, directly connected to the valve pin assembly that axially acts to move pin assembly along the melt flow channel and, by way of motion and position of the valve gate pin to modulate the flow of the plastic polymer through the mold gate. The electrical force actuator has a force in the direction of the motion proportional to the electrical coil current powering the actuator electrical coil. Once positioned in the path of the melt flow, the valve pin assembly is locked in place by a locking assembly, following which the electrical force actuator is de-energized and valve pin assembly maintains its position. During the process of plastic part solidification and removal from the mold, over a much longer portion of the molding cycle, no electrical power is consumed by the actuator until the process demands next motion of the valve pin.

Preferably, the electrical force actuator is a Lorentz force actuator. By utilizing a lock to hold the pin, the actuator is not required to sustain high currant demands over an extended period, thereby permitting the size to be practical for the molding application.

The electrical force Lorentz actuator may thus directly operate and control the plastic flow into a mold cavity without any force or power converting elements.

A further object of the present invention is to provide direct and positive force in an axial direction of the valve pin assembly motion, to move the valve pin in a certain position along the active operating stroke of the valve pin, between the valve open and the valve closed position, without any installed additional positional feedback device.

In the preferred embodiments, the electrical force is directly transmitted from the low inertia electrical coil assembly to the pin where the force on the pin is directly and linearly proportional to the instantaneous amplitude of the current applied to the electrical coil by the electrical drive controller generating an external pulse, or simply by a power supply.

As a further preference, a controller forms an electrical current signal directed to generate axial force on the pin. The electrical signal is formed as a modulated current pulse that provides energy to the valve pin in a measured amount to ensure accurate and repeatable positioning of the valve pin by electrical force. Any motion is arrested by the electrically operated pin locking assembly. Preferably a coil duty cycle suitable for the maximum operating temperature is less than 25%.

BRIEF DESCRIPTION OF THE DRAWINGS

FIG. 7 is an enlarged section of a portion of FIG. 3 showing a valve pin locking assembly;

Figure 1:
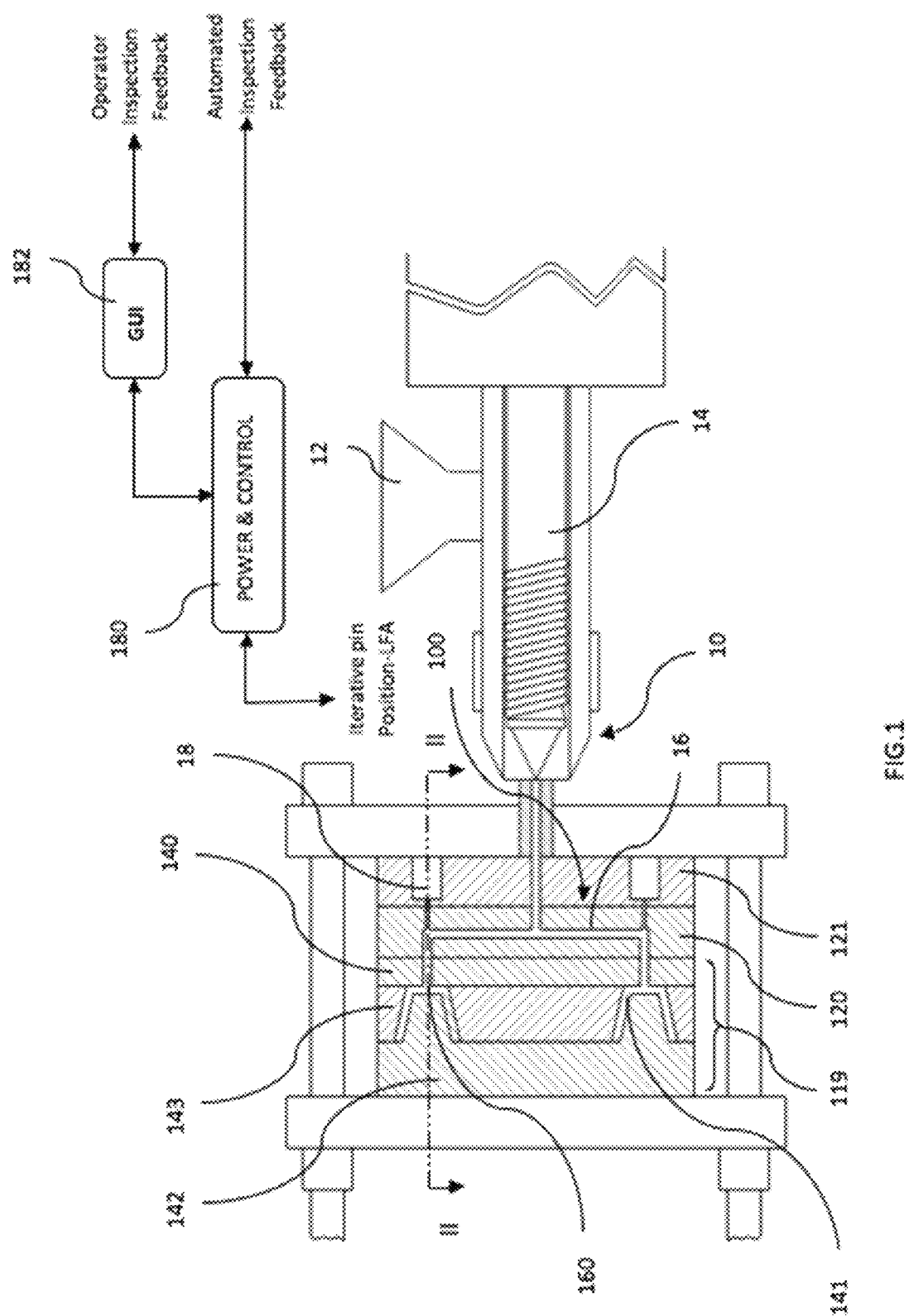
FIG. 1 is a sectional view of a multi-cavity valve gated hot runner injection molding system or apparatus to mold plastic articles like PET preforms.

Corresponding reference characters indicate corresponding components throughout the several figures of the drawings. Elements in the several figures are illustrated for simplicity and clarity and have not necessarily been drawn to scale. For example, the dimensions of some of the elements in the figures may be emphasized relative to other elements for facilitating understanding of the various presently disclosed embodiments. In addition, common, but well-understood, elements that are useful or necessary in commercially feasible embodiments are often not depicted in order to facilitate a less obstructed view of the various embodiments of the present disclosure.

DETAILED DESCRIPTION OF THE NON-LIMITING EXEMPLARY EMBODIMENTS

Referring initially to FIG. 1, a hot runner system (100) receives plastic in a molten state from an injection nozzle (10).

The nozzle (10) is part of an injection machine that includes a hopper (12), heater (not shown), and feed screw (14) as is well known in the art. A control (180) controls operation of the machine to perform the required sequence of operations to produce molded product. The feed screw (14) delivers the plastic material under pressure to the nozzle (10) from where it is delivered through interconnected melt passages (16) to respective mold cavities (141).

The cavities (141) are formed within a mold plate assembly (140) that meet along a common face. The mold plate assembly (140) includes a movable part (140a), and fixed part (140b) may be separated to allow access to the cavity (141) for ejection of a molded article, and are held closed during molding to contain the molten plastic.

The fixed part (140b) is connected to a cavity plate assembly (119) that includes a manifold plate 120 to define the melt passages 16. A backup plate (121) supports the cavity plate assembly (119) to permit the cavity plate (119, 120) to be changed readily without dismantling the entire hot runner system.

Flow through the melt passages (16) in to the cavities (141) is controlled by a gate valve assembly (18) that is located in the backup plate (121) and extends through the cavity plate assembly (119) to the cavities (141). Alternatively, the gate valve assembly may be incorporated in the moveable part (140a) of the mold plate assembly (140) where the configuration of the molded article permits.

As shown in FIG. 1, the cavity plate assembly (119) is configured for a multi cavity gated arrangement with a gate valve assembly (18) associated with each cavity (141).

Figure 2:
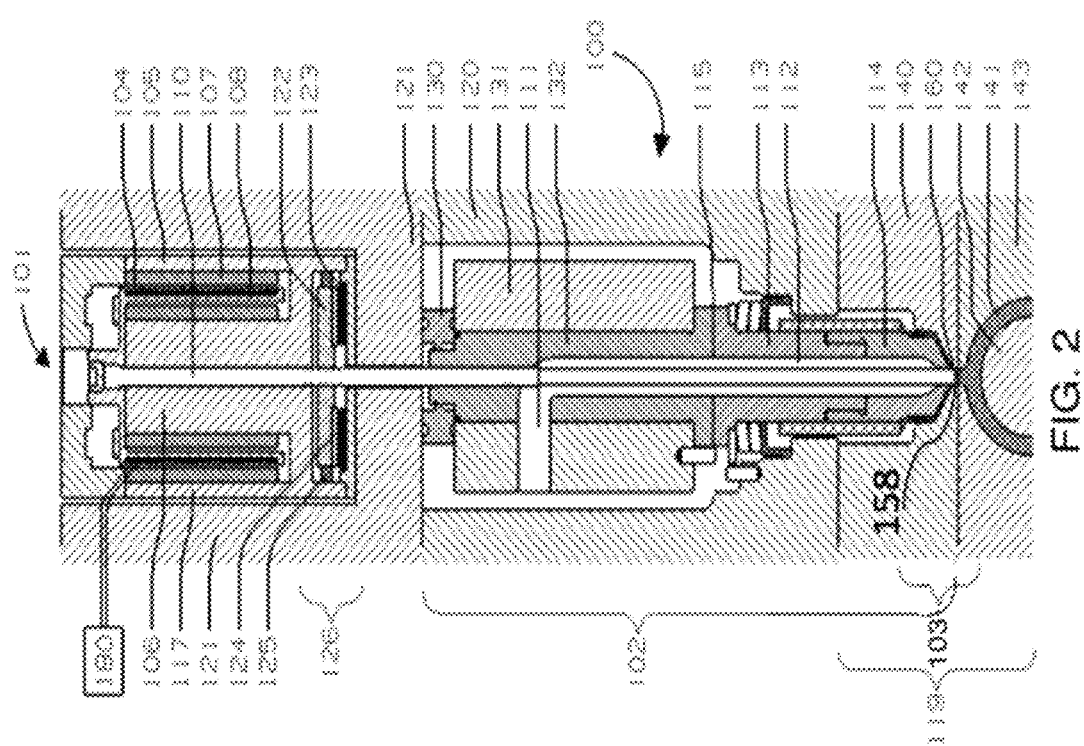
FIG. 2 is a section on the line II-II of FIG. 1.

The gate valve assembly (18) is shown in greater detail in FIG. 2 and includes a melt flow modulating assembly (102) and an actuator assembly (101).

The modulating assembly (102) includes a manifold bushing (132) that connects through a manifold (131) located in a cavity of manifold plate (120) to the melt passages (16). The bushing (132) is connected to an injection nozzle (113) that includes a melt flow channel (112) to convey melt to a nozzle tip (114).

A backup pad (130) supports the bushing (132) against axial displacement.

A valve pin (110) extends from the actuator assembly (101) through the modulating assembly (102) to control the melt flow from the nozzle tip (114).

The manifold plate (120) is used to house the manifold (131) and to distribute molten plastic to each drop, as represented by an injection nozzle (113). The injection nozzle (113) is sealably attached to manifold bushing (132) via a seal off (115) and detachably connects the manifold bushing (132) with the injection nozzle (113).

Each the injection nozzles (113) is heated and the melt flow channel (112) extends therethrough from the rear end to the front end, and flowing into a mold gate (160) located at the interface of the mold plate (140) and the cavity plate assembly (119). The mold gate (160) is defined by a recess at the intersection of cavity plate assembly (119) and mold plate assembly (140) that may have a conical shape. The frontal end of the drop is the nozzle tip (114) and is a commonly replaceable part of the injection nozzle.

In the embodiments shown, the actuator (101) is illustrated as a Lorentz force actuator assembly (101) hereafter referred to as the LFAA assembly (101). A Lorentz force actuator provides a linear force output proportional to a drive current and thereby allows the force generated by the actuator to be modulated by modulating the current supplied.

The LFAA assembly (101) is generally placed in the metal pocket machined in the backup plate (121). The backup plate (121) is water-cooled, and the LFAA assembly (101) is in at least partial thermal communication with the backup plate (121). Preferably, the LFAA assembly (101) is thermally communicating with the backup plate (121) via a partially threaded connection or other type of connection means to permit thermal transfer.

Figure 6:
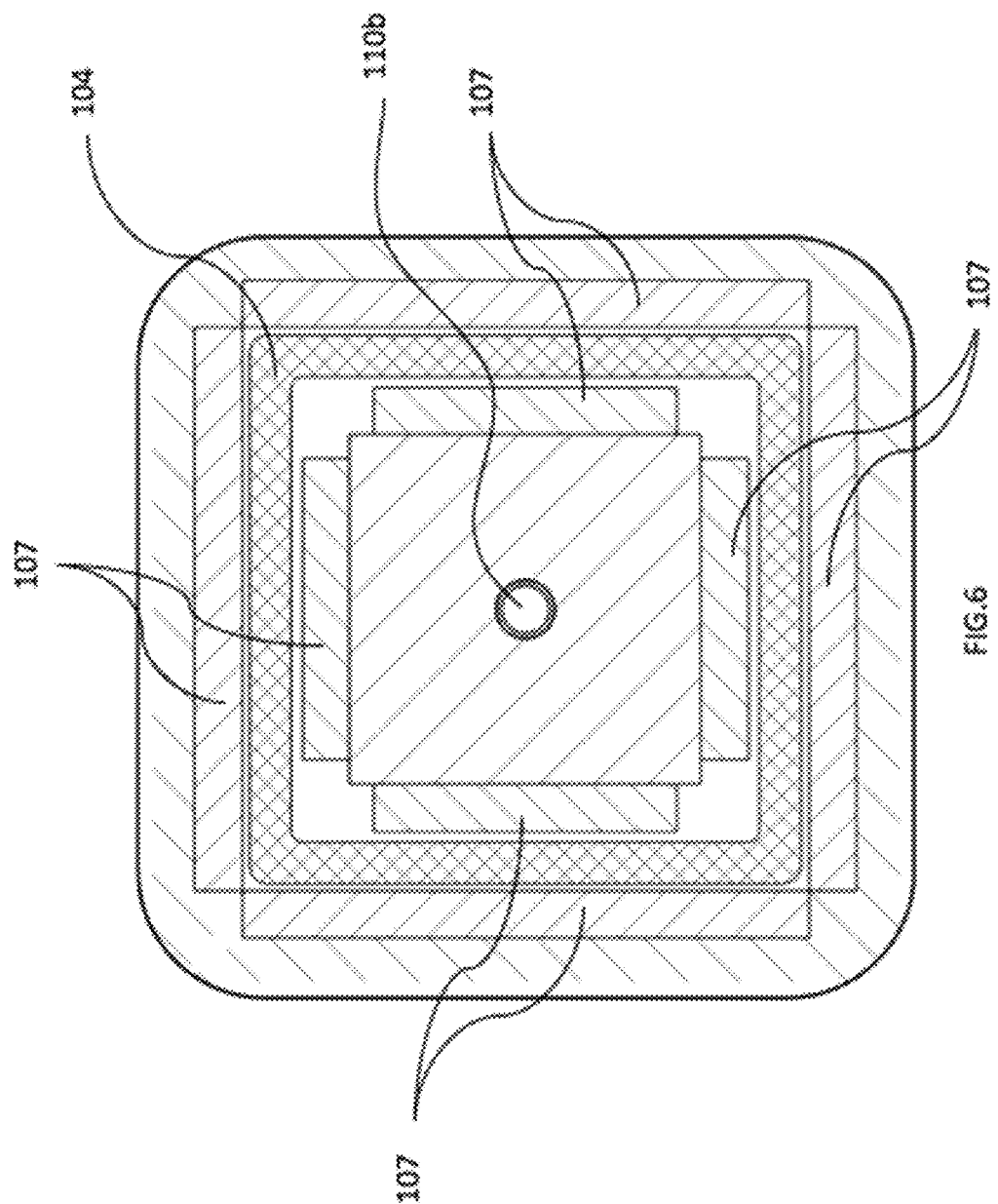
FIG. 6 is a section on the line VI-VI of FIG. 3.

By way of example, when cylindrically shaped, the LFAA assembly (101) can be placed in the pocket by partially or fully threaded connection that acts as a thermal bridge and improves cooling of the LFAA assembly (101). Alternatively, as shown in FIG. 6, a square-shaped configuration of the LFAA assembly (101) can be installed with an interference fit generated by the operating temperature of the Lorentz force actuator assembly (101) and the backup plate (121), or by partially connecting the structure of the LFAA assembly (101) with the backup plate (121) by cover plates (252) extending across the pocket.

Figure 4:
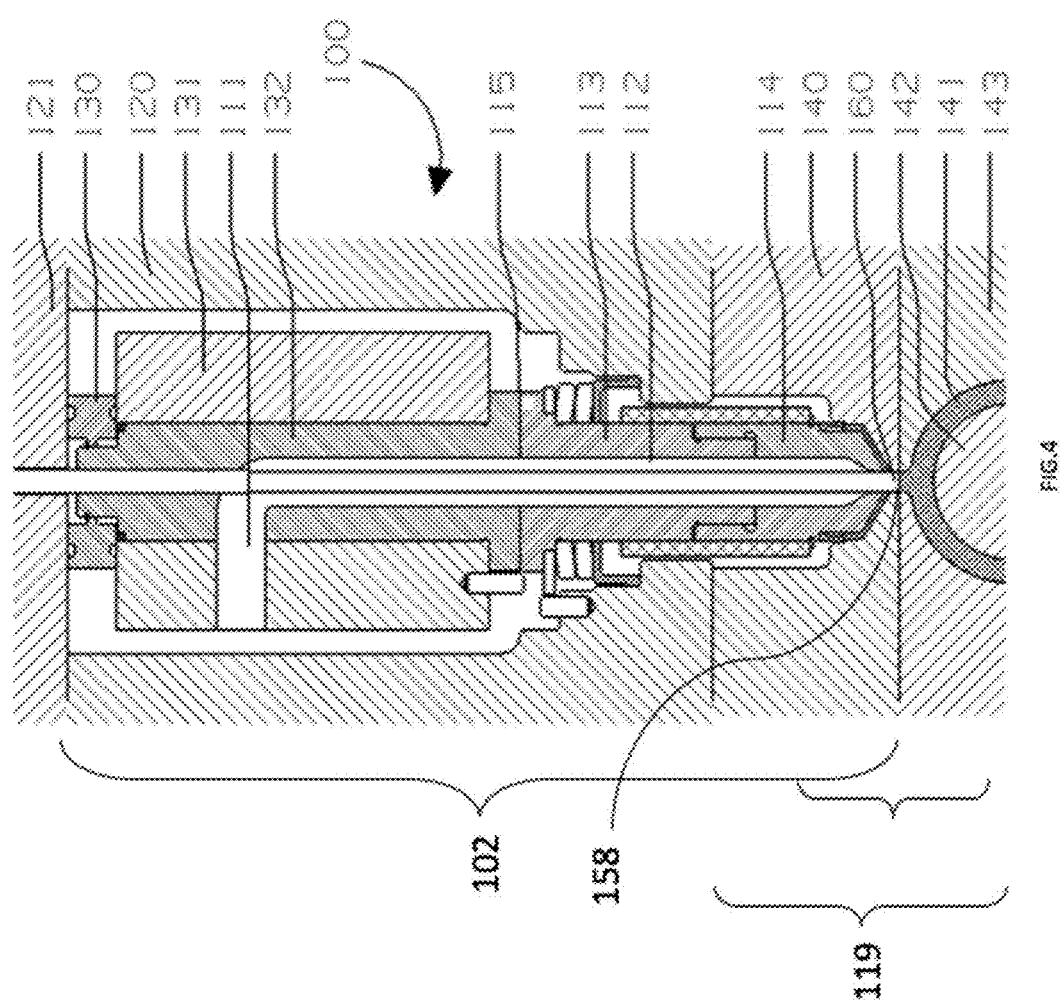
FIG. 4 is an enlarged section of a lower portion of FIG. 2.

A major advantage of this type of the installation is that the LFAA assembly (101) is accessible from the back of the backup plate (121) but at the same time, the installed LFAA assemblies (101), being solid steel structure, strengthen the backup plate (121) at the point where the manifold backup pad (130) (FIGS. 2 and 4) transfers the seal-off forces generated by the melt through the manifold bushing (132) from an injection nozzle seal off interface (115).

With the recent advent of high energy density rare-earth magnets, such as Neodymium, Iron and Boron (Nd—Fe—B), and by modifying the electrical coil (104) accordingly, it is now possible to construct a quite compact, yet powerful, valve gate actuator, such as the LFAA assembly (101), that can under short duty cycle generate substantial axial linear force. As will be described below, this short duty cycle (pulsed) force generation is used to position the valve pin assembly (110) in a desired position along a melt flow path (112).

The LFAA assembly (101) has at least two distinct assemblies: the magnetic closed circuit assembly, and the electrical closed circuit assembly.

Figure 3:
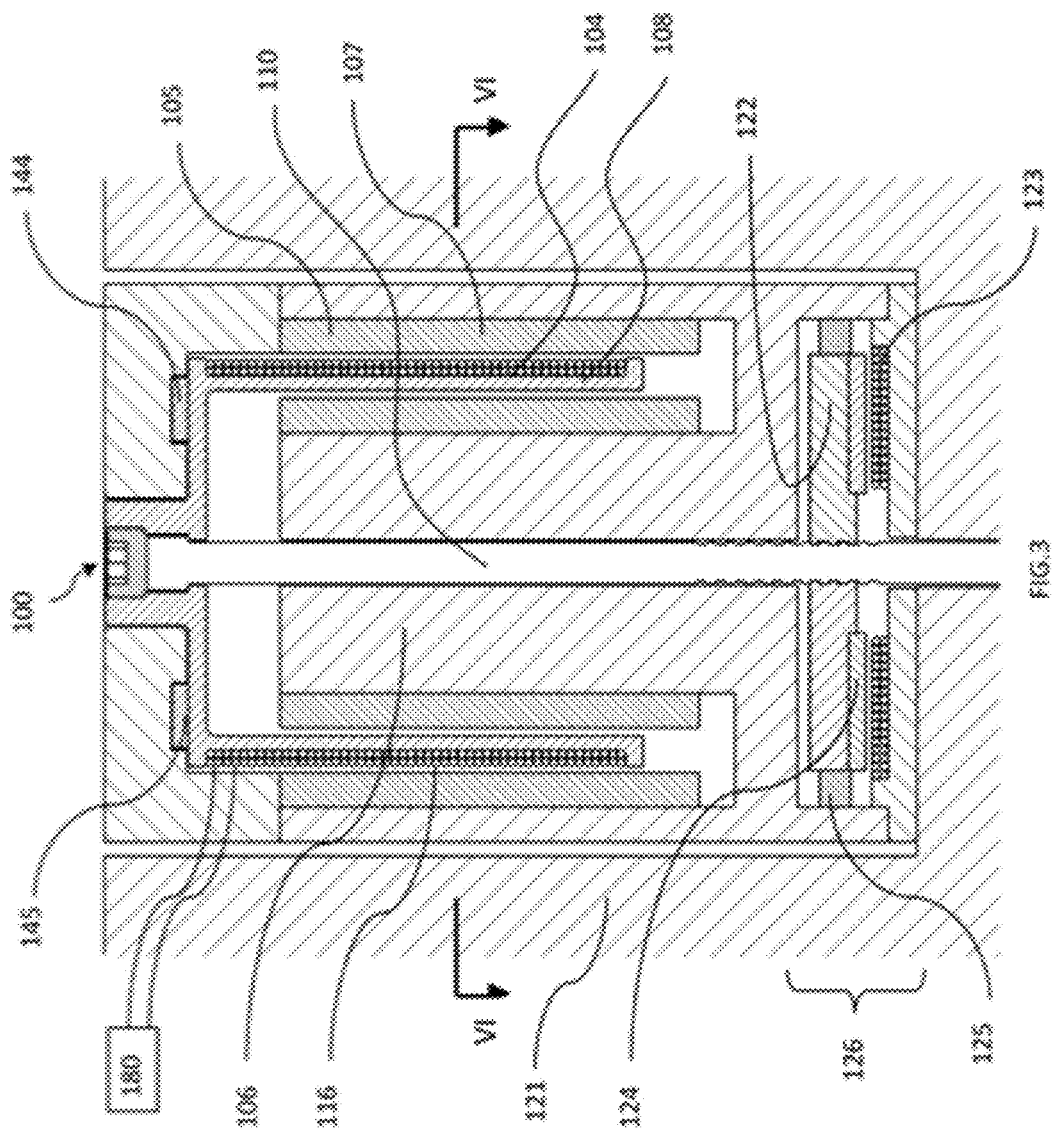
FIG. 3 is an enlarged section of an upper portion of FIG. 2.

As shown in FIGS. 2, 3 and 6, the LFAA assembly (101) has generally two distinct mechanical assemblies acting as the magnetic closed circuit assembly as well as structural parts. A yoke magnetic assembly (105) is used to conduct magnetic force, but also provides a peripheral wall that bounds all parts of the LFAA assembly (101). A core magnetic assembly (106) is located within the yoke magnetic assembly 105. An annular air gap (116) is located between the core magnetic assembly (106) and the yoke magnetic assembly (105). An electrical coil (104) is located in the air gap (116). The coil (104) is wound on a bobbin (108) that passes between the assemblies (105, 106) and has a base (145) connected to one end of pin (110), as described below. A yoke permanent magnet assembly (107) is placed between the inner surface of the yoke magnetic assembly (105) and the core magnetic assembly (106), and thus creates the magnetic flux.

The core magnetic assembly (106) and the yoke magnetic assembly (105) are preferably made from the electronic and magnetic alloys with high magnetic permeability; the higher the permeability, the better the magnetic performance of the magnetic material. The core magnetic assembly (106) presents a low magnetic resistance return path for the magnetic induction generated by the strong permanent magnets. These two parts are operatively connected to make up mainly uninterrupted closed magnetic circuit for the magnetic induction from the strong permanent magnets to pass perpendicularly through.

High saturation properties of the yoke magnetic assembly (105) allow for higher peak current in the coil, and therefore higher induction values before saturation is reached. This allows for the designs of the LFAA assembly (101) that will function with greater force and efficiency, but maintain a linear relationship between current and generated force, according to the Lorentz Force Law.

Some of the exemplary magnetic alloys suitable for high force applications are: Iron-Cobalt or Nickel-Iron alloys with high magnetic permeability and high flux density. Uses of the 430FR type of the ferritic chromium steel alloys have demonstrated good usability of the application in the preferred embodiments.

It is highly desirable that the magnetic flux path of the core magnetic assembly (106) and the yoke magnetic assembly (105) is arranged so that the magnetic flux generated by the core magnetic assembly (106), or the yoke magnetic assembly (105), or both the yoke magnetic assembly (105) and the core magnetic assembly (106), which may be permanent magnets, are perpendicular to the electrical coil (104) within the air gap (116), so that when an externally applied current conducts through the electrical coil (104), the electrical coil (104) will be displaced axially along the axial magnetic air gap (116), and the amount of the displacement is linearly proportional to the applied current.

The yoke permanent magnet assembly (107) can be made from any high quality permanent magnets in the form of the magnet bars or elongated arcuate segments, magnetized through the thickness of the bars or segments, and suitably arranged to cover the inner surface of the yoke magnetic assembly (105) in a way to create a uniform unipolar field in the axial magnetic air gap (116). Preferably, a neodymium magnet (also known as NdFeB, NIB, or Neo magnet), is used in the preferred embodiments, and it is a strongest type of rare-earth permanent magnet. The neodymium magnet is a permanent magnet made from an alloy of neodymium, iron, and boron to form the Nd2Fe14B tetragonal crystalline structure resistant to demagnetization. General Motors and Sumitomo Special Metals developed these neodymium permanent magnets in 1982, but only recently are these magnets being made readily available. The neodymium magnet has replaced other types of magnets in the many applications in modern products that require strong permanent magnets. The most preferred type is in the class N52, specifically designed for demanding mechatronic applications and is readily available. This type of the permanent magnet is not susceptible to demagnetization due to high current flow in the electrical coil (104).

The permanent magnets (107) could also be placed on the core magnetic assembly (106). The permanent magnet assemblies could also be distributed between the core magnetic assembly (106) and the yoke permanent magnet assembly (107). These assemblies can be paralleled by using sets of the electrical coils in parallel, where multiple coils would be acting on the valve pin assembly (110) and thus increasing the axial force.

A high density magnetic field in the axial magnetic air gap (116) is achieved by the LFAA assembly (101). Other types of the magnetic structures like a ring magnet with radial magnetization can be used as long as a uniform, high density, unipolar magnetic field is produced within the axial magnetic air gap (116). In the preferred structure of this embodiment, as seen in the section of FIG. 6 square bar magnets (117) are used to create a uniform magnetic field in the axial magnetic air gap (116) so that force due to a current in the electrical coil (104) is acting in the axial direction and is centered to drive the valve pin assembly (110) axially along the melt flow channel (112), and not imparting any side forces on the valve pin assembly (110). Bar magnets are used because no strong permanent magnet is available today in the form of the radially magnetized ring due to difficulty in manufacturing, but these may be available for consideration in a preferred embodiment in the future.

Referring back to FIGS. 2 and 3, an electrical coil (104) is wound onto a coil bobbin (108) that is positioned between the core magnetic assembly (106) and the yoke magnetic assembly (105), and is free to move along the axial magnetic air gap (116). The electrical coil (104) is preferably made from a highly conductive material like silver and/or copper but an aluminum coil may be used in some applications. The electrical coil (104) may be wound on the coil bobbin (108), which is made from plastic composites. A fine balance is made between the number of turns and the required axial force. Preference is given to structures without a separate coil bobbin (108) where the electrical coil (104) has a winding and coil binder, or hardening resins act together as self-supporting structures with solid integrity. The electrical coil (104), made from the rectangular profile wire, intertwines with the Kapton ribbons or fibers and baked in a high temperature resin, has the strength to support impulse forces expected in the preferred embodiment of this invention. An electrical coil can be made from segmented individual turns, preferably flat stamped, and only when assembled together are all the turns (of the coil) electrically interconnected. As well, the electrical coil (104), in form of a "slinky", and/or made from silver or pure copper material, can provide a distinct advantage in the preferred embodiments because the electrical coil (104) may provide a structure without the coil bobbin (108).

Among the materials suitable for application to improve the structural integrity of the electrical coil (104) is one of the DuPont (TRADEMARK) Kapton (TRADEMARK) MT polyimide film, a homogeneous film possessing three times the thermal conductivity and cut-through strength of the standard Kapton (TRADEMARK) HN film. This polyimide film has thermal conductivity properties that make it ideal for use in dissipating and managing heat in electronic assemblies, such as printed circuit boards and electrical coils with high integrity windings. It is anticipated that other materials and forms can be used for making reliable coils and, therefore, expand the applicability of this invention. High coil integrity is required due to high acceleration and deceleration rates of the electrical coil (104).

The material used in the electrical coil (104), in some embodiments, could be made from highly conductive soft magnetic alloys, to reduce the effective air gap and to increase the valve-pin closing force. However, the opening force may be nonlinear and may be reduced with the use of such a coil.

Also, highly conductive graphite used in the electrical coil (104) when combined with oriented thermally-and-electrically-conductive nano-material structures with high axial integrity may be used to support the axial force, and may be an example for some embodiments. To modify coil performance, the air gap may be filled in with nano-magnetic fluids.

It is likely that some applications may require an electrical coil made over a bobbin by techniques well known in printing with thin and/or thick film or even by deposition of the conductive coil material over layers of dielectric by spray techniques also known in the industry. Other embodiments may select to photo etch the coil patterns, or even plate the coil patterns but all of these and other techniques are anticipated by this invention.

Flexible power leads connect the electrical coil (104) to the control (180) that provides a current pulse electrical signal. Suitable flat litz wire or flat flexible ribbon can be used for this application.

Figure 8:
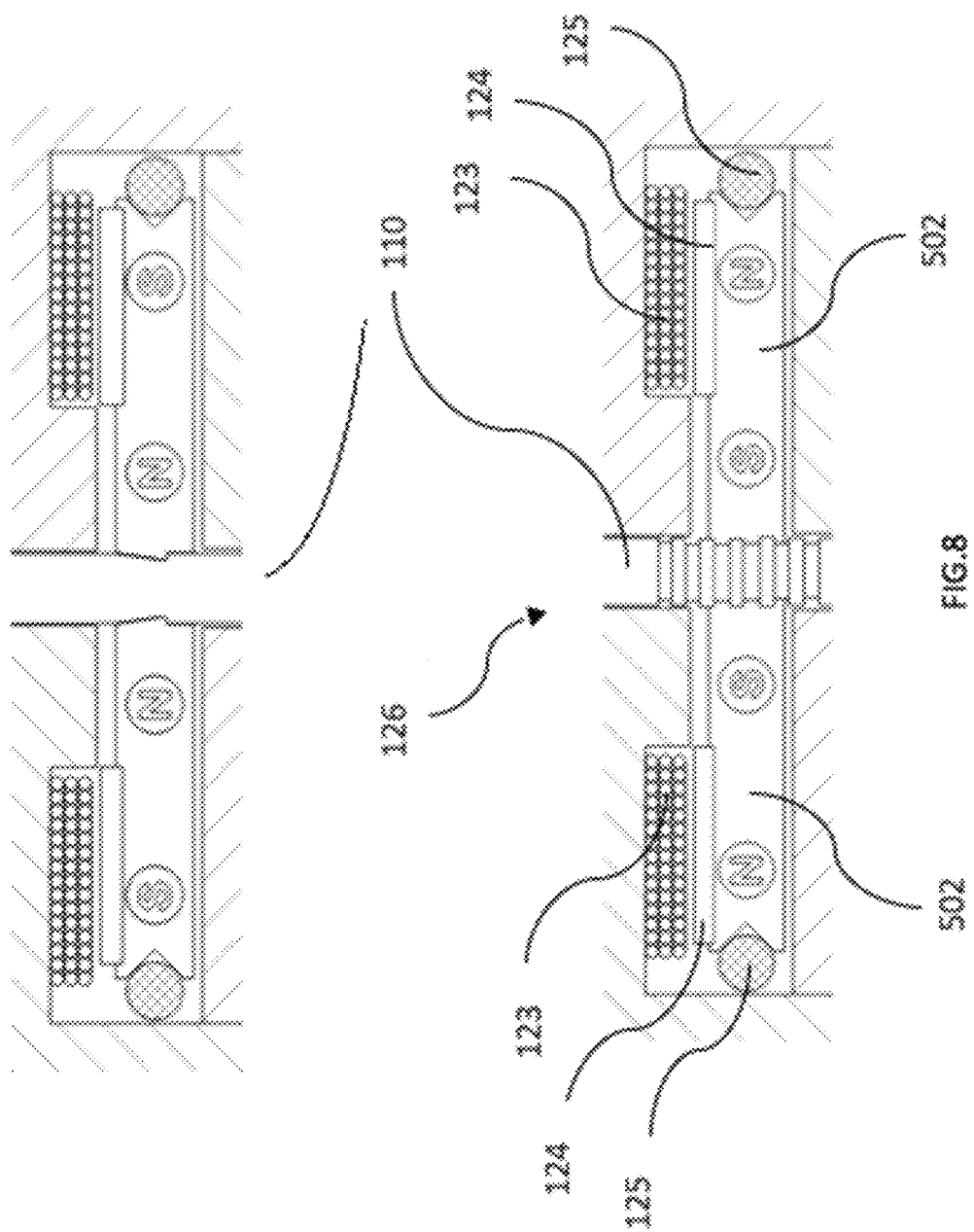
FIG. 8 is a view on the line VIII of FIG. 6.
Figure 9:
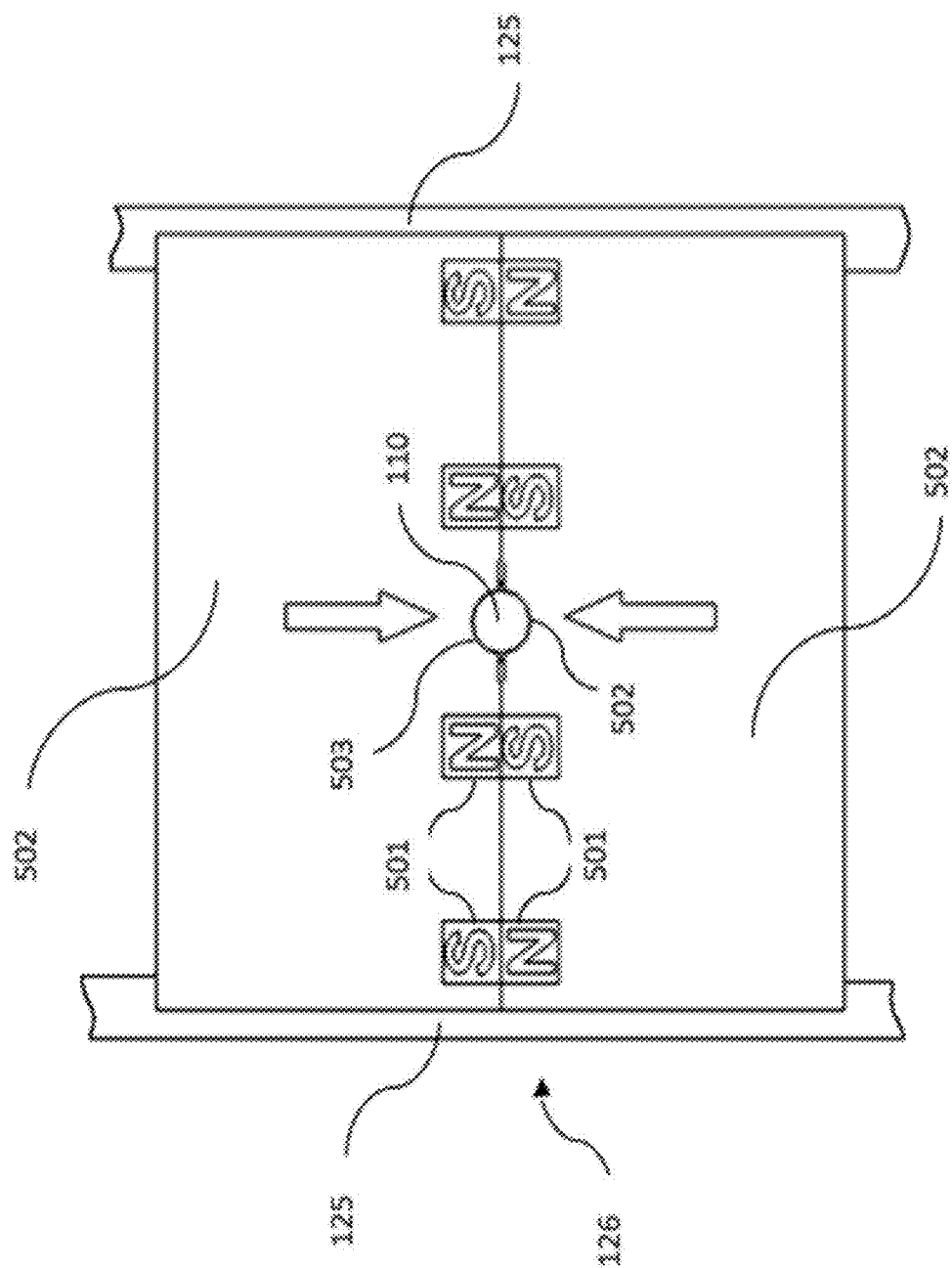
FIG. 9 is a view on the line IX-IX of FIG. 7.

Referring again to FIG. 2, a mechanical pin locking assembly (126) is installed in the bottom portion of the yoke magnetic assembly (105). As illustrated more fully in FIGS. 7-9, a pin-locking slide (122) is made to move laterally along lock slide guides (125). As can be seen in FIGS. 7-9, the assembly (126) includes a pair of jaws 502 that are slidably mounted on the guides (125). Each of the jaws (502) has a recess (503) configured to conform to the outer surface of the sliding pin (110). The opposed faces of the jaws (502) have magnetic holding springs (501) embedded therein to provide an attractive force in the direction of closing around the valve pin assembly (110). As can be seen in FIG. 2, the pin (110) includes surface formations such as a lock thread 330, intended to be engaged by the jaws (502) and prevent the valve pin assembly (110) from moving axially when operating power from the LFAA assembly (101) is removed within the cycle of the molding of the plastics parts. The axial length of the surface formations is equal to an approximate length of the total axial stroke of the valve pin assembly (110).

A pin-locking coil (123) is placed inside the yoke magnetic assembly (105) just below the pin-locking slide (122). A set of pin locking permanent magnets (124) is carried by each of the jaws (502) so as to be horizontally disposed above the coil (123). Energization of the coil (123) cause the magnets (124) to apply a force to separate the jaws (502) and thereby release the valve pin assembly (110) to allow axial movement when the LFAA assembly (101) is energized. In the arrangement shown, it is advantageous to install the pin-locking coil (123) below the pin-locking slide (122) to facilitate assembly and improve cooling of the pin-locking coil (123).

As noted above, the valve pin assembly (110) has a surface formation indicated at 330 that provides a locking feature. The pin-locking feature (330) is formed as a thread and is positioned some distance from the distal end of the valve pin assembly (110), and is located in the axial position of the mechanical pin locking assembly (126). In the preferred embodiment, the pin-locking feature (330) is operatively engaged by the jaws of the lock slide guides (125) to prevent any axial movement of the valve pin assembly (110) when the LFAA assembly (101) is de-energized. In this way, the pin-locking feature (144) operatively arrests motion of the valve pin assembly (110) during a gate open condition or a gate closed condition within a molding operation.

Because of the short duration of the axial valve pin movement (less than 35 ms or milliseconds), a relatively high current pulse can be used and not overheat the coil windings.

An active short duty cycle of the valve pin assembly (110) allows for long power off time with a separate instance of a mechanical pin locking assembly (126) as will be discussed below.

The pin-locking coil (123) and the electrical coil (104) can be energized in a required sequence determined by the mold sequence controller (180), or can be energized at the same time to open the pin-locking slide (122) and move the valve pin assembly (110) axially.

Figure 10:
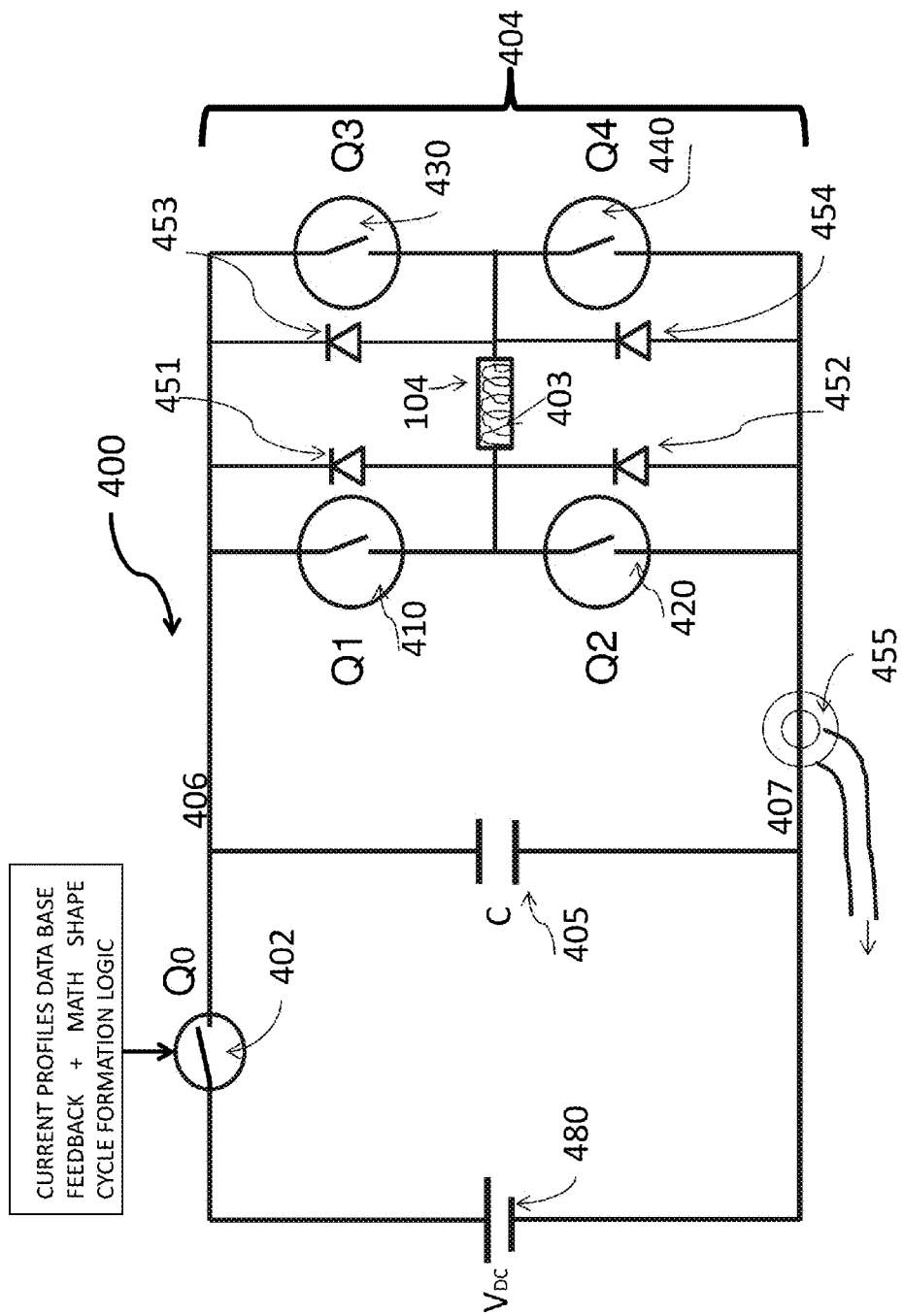
FIG. 10 is a simplified block diagram of an electronic valve gate drive controller used with the apparatus of FIG. 1.

The control of the coils (104,123) is provided by the electronic valve gate drive controller (400) that is part of the controller (180) and is shown as simplified block diagram in FIG. 10.

An energy storage capacitor (405) is provided and is capable of storing and discharging, on demand, a certain calibrated amount of electrical energy into the electrical coil (104) of FIG. 1. The energy storage capacitor (405) is operatively connected to conduct an electrical charge via the electrical wire supply (406) and the electrical wire return line (407) to the electronic switch Q1 (410) and the electronic switch Q3 (430). The electronic switch Q1 (410) and the electronic switch Q3 (430) operatively control the directional flow of the electrical current through the actuator coil (403) of the LFAA assembly (401). A second set of electronic switches Q2 (420) and Q4 (440) facilitates the flow of the electrical current through the actuator coil (403) by being operatively switched on and off in a precisely determined order and with particular timing based on the input from the control computer.

The electronic switch Q1 (410) and the electronic switch Q2 (420) cannot be in an operatively ON state at the same time; this will cause a short circuit to the energy storage capacitor (405). Also, the electronic switch Q3 (430) and the electronic switch Q4 (440) cannot be closed in the ON state at the same time.

A duty cycle controller Qo (402) is provided to optimize and control the level of charge in the energy storage capacitor (405). The duty cycle controller Qo (402) charges the energy storage capacitor (405) via the electrical conductors that are suitably connected from the energy storage capacitor (405) to the duty cycle controller Qo (402). The duty cycle controller Qo (402) operatively charges the energy storage capacitor (405) in a predetermined and controlled sequence, operatively based and referenced to the operational cycle of the molding apparatus. This is done in a way that the LFAA assembly (101) will be energised only when axial motion of the valve pin assembly (110) is requested, with a particularly controlled duty cycle, and this arrangement prevents damage to the LFAA coil assembly (104) due to overheating temperature of the actuator coil (403) due to the high current. Recharging the energy storage capacitor (405) is required after each single axial movement of the valve pin assembly (110) to ensure accurate capacitor charge and improve accuracy in the positioning of the valve pin assembly (110). The LFAA assembly (101) is intended to operate only with a limited duty cycle. In the preferred embodiment, the duty cycle should not exceed 25%. In another embodiment, process demand for a short cooling time duty cycle may be less than 10%. The axial move time is preferably less than 10 ms (milliseconds).

The duty cycle indicates both how often the LFAA assembly (101) will operate and how much time there is between operations. Because the power lost to inefficiency dissipates as heat, the actuator component with the lowest allowable temperature, usually the actuator coil (104), establishes the duty-cycle limit for the complete instance of the LFAA assembly (101).

The duty cycle is relatively easy to determine if the LFAA assembly (101) is used on a molding machine, since the repeatable cycle of the molding machine has intervals when the LFAA assembly (101) is demanded to be energized (during valve closing or opening only), and de-energized (during mold cooling and part handling time). The provision of the pin locking assembly 126 enables a very short electrical actuator power ON time as there is no longer a need to maintain power to the actuator coil (104) once the valve gate (110) is closed or the valve gate (160) is opened. The actuator coil (104), is ON only during the axial translation of the valve pin assembly (110) from the first preferred position (usually open), to the second preferred position (usually closed). During all other process times, the LFAA assembly (101) is locked into preferred positions with no demand for power. The pin-locking stroke of the jaws (122) is very short, usually only as much as is required to maintain the arrest position of the valve pin assembly (110). It is anticipated that the opening time of the pin locking assembly (126) is scheduled before the valve pin assembly (110) is directed to move, although some overlapping in sequence may be conceivable.

Operating on the edge of the molding's power curves, i.e. shortest possible mold cycle time, might incur the risk of the LFAA assembly (101) running hot. However, the generous cooling time available for solidification of the plastic in the mold enables heat in the coil (104) to be dissipated. In most applications, molding PET or other food and medical moldings, where the duty cycle is 5% or less, the LFAA assembly (101) can run to the limit of its power curves, once the backup plate cooling is effective. The duty cycle of the electrical locking coil (123) has no limit on duty cycle because the coil impedance limits the excessively high current flow to cause any overheating. The longer part of the operational cycle of the valve pin assembly (110) is normally maintained by the permanent magnets, and all coils are without power and are self-cooled and are getting ready for the next movement cycle of short duration.

Referring back to FIG. 10, the actuator axial force is generated upon a request from the controller (180) for the energy storage capacitor (405) to discharge. The controller (180)

implements computer software instructions to effect control (as is well known to those skilled in the art of computers) of the gate drive controller (400). The controller (180) may request closure of the electronic switch Q1 (410) and the electronic switch Q4 (440). The energy storage capacitor (405) is operatively short-circuited by the electronic switch Q1 (410) and the electronic switch Q4 (440) and connected with the electrical wire supply (406) and the electrical wire return line (407), will discharge a certain calibrated amount of electrical charge to move the valve pin assembly (110) of FIG. 1 to the preferred position, be it in the open direction or the closed direction. The amount of charge in the energy storage capacitor is selectable by the operator, via the valve gate controller logic and the operator interface screen (182). At the same time, the coil (123) is energized to release the jaws (502).

Figure 11:
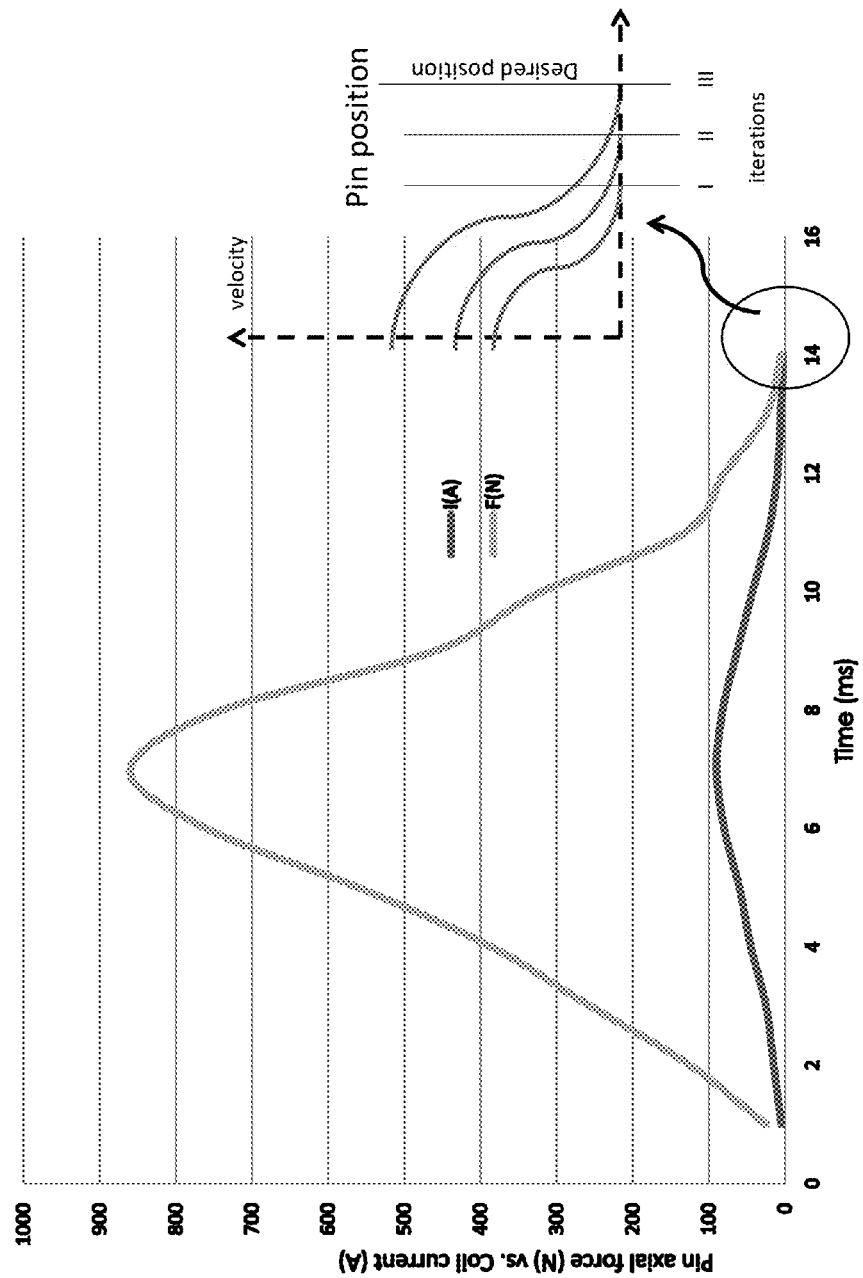
FIG. 11 is a plot showing the relationship between force and current over time provided by the actuator of FIG. 2.

Once a high current flows through the actuator coil (403), an axial force in the direction of the air gap (116) will push the valve pin assembly (110) axially to the desired position. Once the position is reached with a slow speed (i.e., below 5 to 25 mm/s (millimeters per second)). As shown in FIG. 11, the current pulse, shown by the dark line, progressively increases and then decreases over the duration of the pulse. The corresponding force generated is shown in the lighter line and follows the profile of the pulse. The force applied to the pin (110) initially accelerates the pin (110), causing it to move toward the closed position. The acceleration is opposed by the inertia of the pin (110) and by the resistance of the motion of the pin (110) through the plastic in the melt flow channel (112). As the current is reduced, the force generated by the actuator (103) is correspondingly reduced and the velocity of the pin (110) progressively reduces, due to the resistance of the plastic melt, so that, as the pin attains the closed position, its velocity approaches zero.

The shape of the pulse is selected to provide an optimum velocity profile in both the closing and opening direction. It will be appreciated that a more aggressive declaration can be obtained by reversing the direction of current flow in the coil 104 during movement, and that the pulse shape may be different between opening and closing directions.

Upon attainment of the open and closed position, the pin locking assembly (126) will de-energize and lock the valve pin assembly (110) in the targeted preferred position. No power is applied, nor is required, for the locking coil to hold the valve pin assembly (110) in the arrested position. In a preferred embodiment of this invention, the force of permanent magnets (501) locks the valve pin assembly (110). When the valve pin assembly (110) is locked, the electronic switch Q1 (410) and the electronic switch Q4 (440) are open (OFF).

Next, the duty cycle controller Qo (402) requests re-charging of the energy storage capacitor (405) from the suitable bus voltage power supply (480) according to demanded charge levels.

Once charged back to a demanded energy level, the request for movement of the pin (110) from the closed position to the open position may be initiated by closing the electronic switch Q3 (430) and the electronic switch Q2 (420). The locking coil is energized to release the latch and permit movement of the pin (110). The controller (402) provides a current pulse to move the pin (110) to the closed position and decelerate it at the closed position. The latch is released to hold the pin (110).

Since the transition time of the coil and energizing coil (123) in the modern power switching device is a fraction of a microsecond, modulation and intervention in the shape of the energy pulse is possible to ensure formation of an accurate and most desirable pulse shape.

Total stroke time for the axial distance of about 7 to about 9 mm (millimeters) is demonstrated to be about 5 to about 10 milliseconds, and is largely dependent on the size of the coil assembly of the LFAA assembly (101).

The control pin movement (110) by coil (104) and the high forces available make it possible, in the preferred embodiment, to profile the end of the stroke to best meet the demanding quality of the gate vestige without using complex servo controlled positioning based on the position feedback device.

The nature and the application of the preferred embodiment for an injection mold of the hot runner application allows for good vestige of the molded parts to be examined by the operator for each cycle of the machine during setup and pre-run verification, and suitable correction to the inputs can be made during the setup process to modify the pulse shape and the closed pin position. As shown in FIG. 11, adjusting the pulse shape at each iteration allows incremental changes in the position of the pin (110) until the optimum position is attained. Once attained, the shape may be saved in the controller (402) for repetitive molding operations. If inspection shows deterioration of the vestige, an adjustment can be made by the operator through the interface (182).

The primary parameter for controlling movement of the pin (110) is the current supplied from the capacitor Q5. The rate of current is 50 to 100 A/millisecond (amperes per millisecond), and the limit for the peak current is set by comparing the current feedback from a current feedback device (455) at the electronic valve gate drive controller (400) and the set peak current. The set peak current is an operator-controlled set point from the operator machine interface computer (182) and is based on the preferred axial position for the valve pin assembly (110). This input, the capacitor charge, may be generated by the operator based on the part quality observed or it may be automatically selected from a molding parameter set data matrix. The log matrix in the form of the lookup table can be implemented to compare the vestige quality with the valve pin position, as attained using a selected current pulse shape, and use this information as a teaching tool for an optimum new position set point of the valve pin assembly (110). Controlling the current through the electrical coil based on a certain set value may be accomplished by implementing the hysteretic control model where the hysteretic control circuit in the valve gate controller turns the electronic switch Q1 (410) or the electronic switch Q3 (430) OFF when the current amplitude reaches the upper set point value, and then turns the electronic switches back ON when it reaches the preset lower values amplitude point. This control scheme may be used in a standalone manner to improve valve pin positioning and therefore improve the part vestige, or in combination with other methods like iterative learning control (ILC) as discussed more fully below. It will be appreciated that the control 400 will incorporate memory buffers, set point comparators, timers and devices like digital microprocessors in the valve gate driver circuit of FIG. 10, in various known ways, and packaged in the electronic valve gate drive controller (400) suitably built to operatively interface with the operator input device and a molding machine computer to logically control the vestige quality by accurately positioning each instance of the valve pin assembly (110). Control monitoring of the electrical current pulse by current-sensing power MOSFETs provide a highly effective way of measuring load current through the electrical coil (104) in FIG. 1 of the LFAA assembly (101).

The current plot of the current is compared to the preferred plot to reduce positioning error for the valve pin position. Valve pin positioning accuracy of plus or minus five micrometers can be achieved by implementation of Iterative Learning Control (ILC) in valve pin positioning in the hot runner systems or injection molding, and can improve valve pin positioning.

Figure 15:
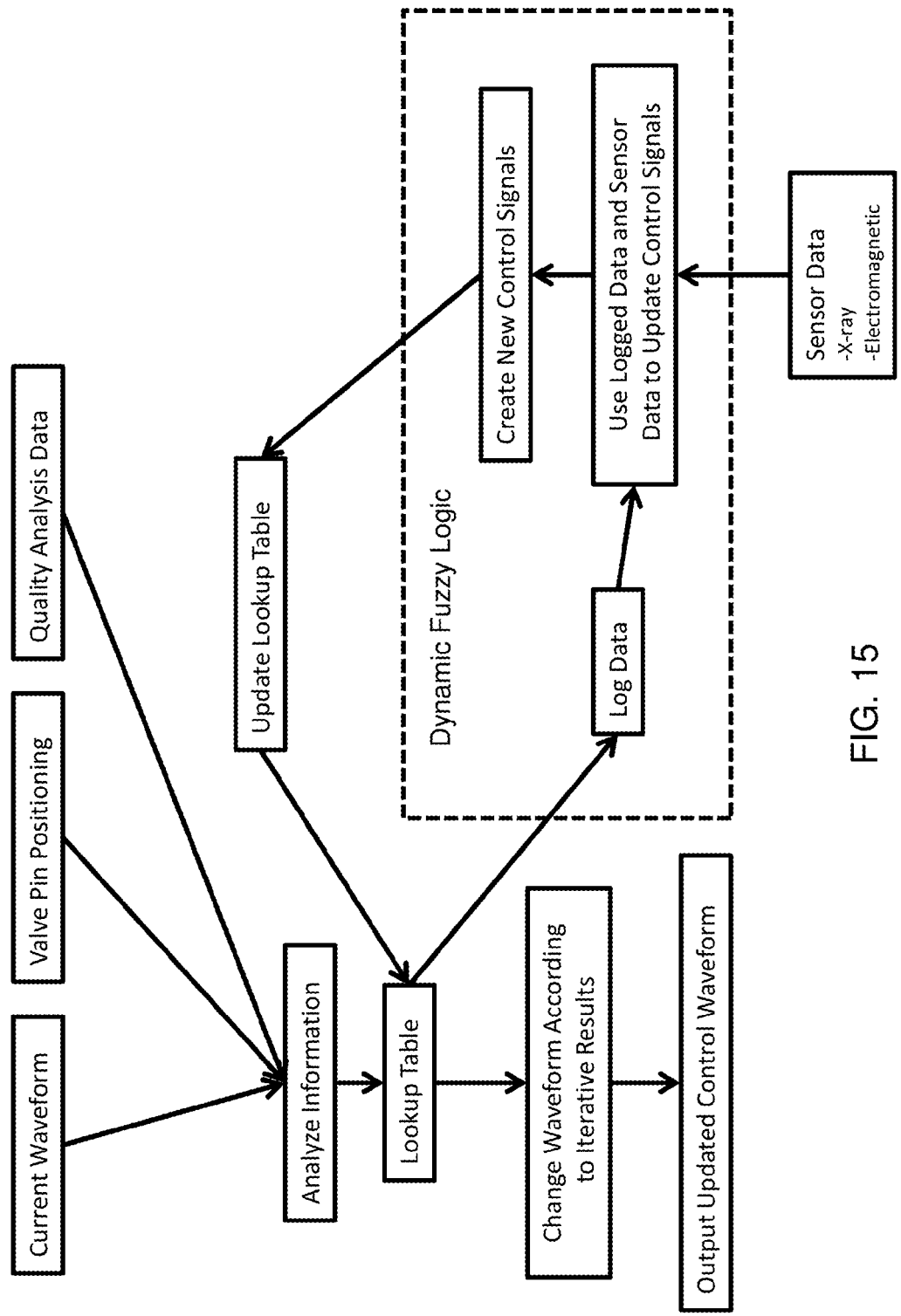
FIG. 15 is a flow diagram of a single iteration of waveform control signals.

The use of ILC is shown schematically in FIG. 15 and is a method of improving control parameters for systems that function in a repetitive manner. The repetition involved in valve positioning provides typical conditions to use iterative learning techniques. There is room for significant positional accuracy improvement and, therefore, improvement in the vestige quality of the moldings when using the Lorentz force actuator assembly (101) in FIG. 2. ILC can be implemented in any system that is required to perform the same action for millions of cycles with high precision. Each repetition or cycle allows the system to improve tracking accuracy, gradually learning the required input needed to track the reference to a small margin of error. The learning process uses information from previous repetitions to improve the control signal, ultimately enabling a suitable control action to be found.

Through iterative learning perfect tracking of the valve pin position can be achieved. Perfect tracking is represented by the monotonic convergence of the mathematical model. Iteration allows for monotonic convergence to achieve more accurate positional accuracy of the valve pin assembly (110) in a molding application of the hot runners. Experiments demonstrate convergence within 5 to 10 pin cycles. After achieving convergence the valve pin assembly (110) will be able to operate in a stable state.

To improve the speed of convergence fuzzy logic can be implemented as part of the ILC. Improved parameters for the ILC algorithms can be attained through the use of external sensor feedback. These sensors could include; x-ray sensors, electromagnetic sensors, or other appropriate sensors that would provide meaningful information. The ILC algorithms and fuzzy logic parameters can be updated in real-time or through analysis of previously collected and stored data. The result of the combination of real-time dynamic parameter modification is a self-tuning system that will have automated tracking accuracy of the open loop valve pin positioning. The fuzzy system is used to precisely position the valve pin tip of FIG. 3 without installing any physical motion or position feedback device or structure within the valve pin stroke. Turning back to FIG. 10, the inherent characteristic of the actuator coil (403) of the LFAA assembly (104) to slow down in the magnetic field when coil terminals are short-circuited can be operatively used to slow down the axial movement of the coil of the LFAA assembly (104). This can be accomplished by opening the electronic switch Q2 (420) and the electronic switch Q4 (440), and closing the electronic switch Q1 (410) and the electronic switch Q3 (430). The flyback diodes (451, 452, 453, 454) functionally support the switching operation of the electronic valve gate drive controller (400).

The operation of the gate valve assembly will now be described, assuming initially that the pin (110) is held in an open, i.e. retracted position by the jaws 502 engaging a lower portion of the screw thread (144). The coils (104, 123) are de-energized and the jaws held closed by action of the magnets (501). The first step in the operation of the LFAA assembly (101) involves application of the suitable electrical current pulse through the electrical coil (104) (FIG. 2), and at the same time the application of the voltage to the pin-locking coil (123). The pin-locking coil (123) reacts with the pin locking permanent magnets (124) and separates the jaws to unlock the valve pin assembly (110). The current applied to the electrical coil (104) operatively reacts to a magnetic field from the permanent magnets, generates a force perpendicular to the current flow through the electrical coil (104), i.e. in the axial direction of the pin 110. Therefore accelerates the valve pin assembly (110) in the direction of the actuator force pushing downward to close the mold gate as per FIG. 1.

The next step in the operation of the LFAA assembly (101) is to decelerate the valve pin assembly (110) to the gate closing point, but not to impact the mold gate (160) and to cause any damage by hard stops. The electronic valve gate drive controller (400) modulates the current pulse to follow the shape of the current profile in the controller memory predetermined by experiments for the type of the product that is being molded. The electronic valve gate drive controller (400) follows a shape of the current signal already stored in the controller memory within the proportional hysteresis bandwidth and based on the current feedback from the electronic drive controller, and determines optimal deceleration slope of the current pulse. The electronic valve gate drive controller (400) has the ability to brake by shorting the electrical coil (104) by switching the appropriate electronic switches in FIG. 10 (specifically, the electronic switch Q1 (410) and the electronic switch Q3 (430) are set OFF, and the electronic switch Q2 (420) and the electronic switch Q4 (440) are set ON) to accurately stop the valve pin assembly (110) and "soft land" the valve pin assembly (110) into a gate closed position or any preferred position within the axial stroke of the LFAA assembly (101).

Figure 5:
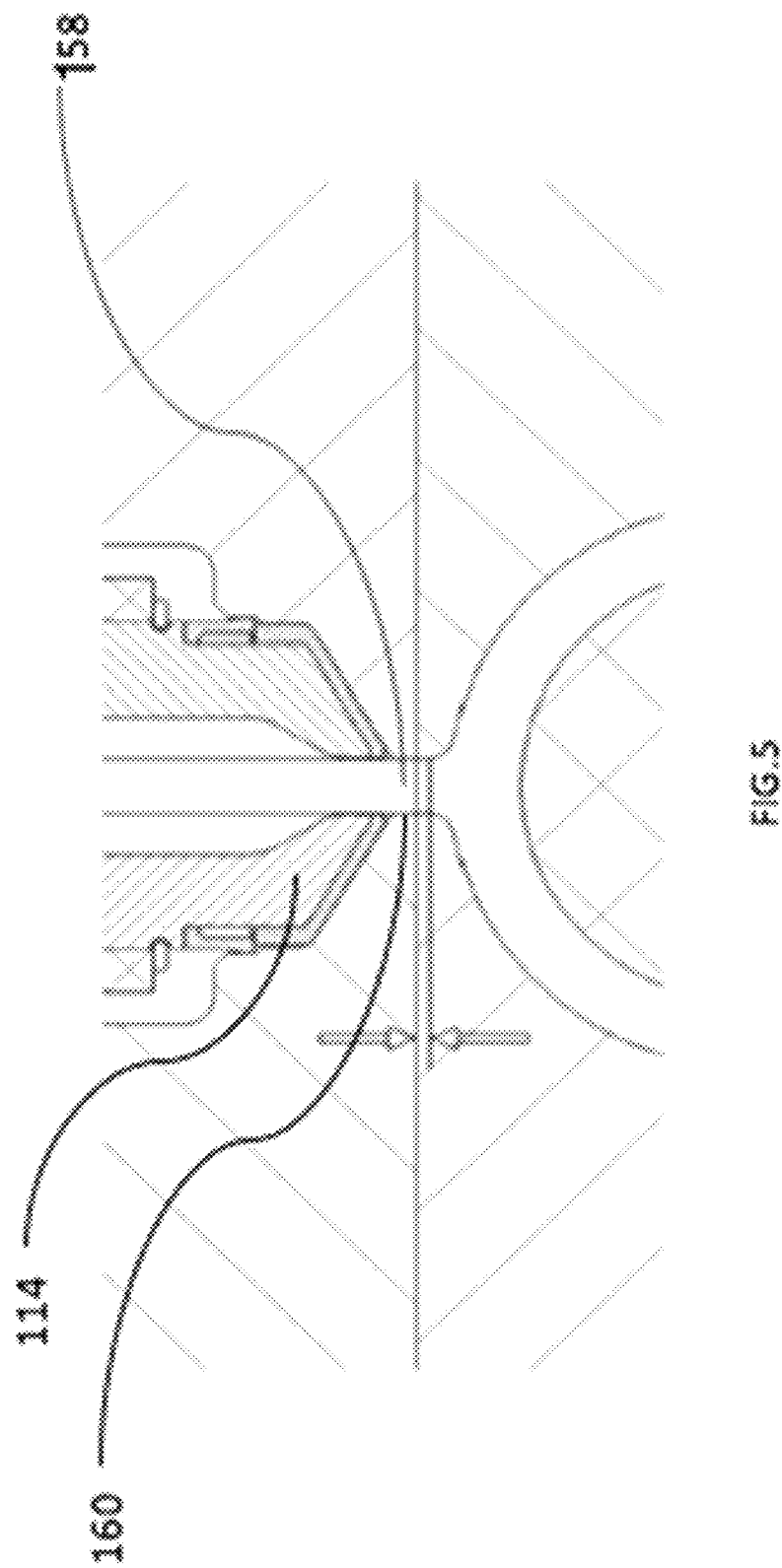
FIG. 5 is an enlarged section of a portion of FIG. 4 showing a valve pin closed portion.

When it is anticipated that the valve pin assembly (110) has arrived at the preferred position, the pin-locking coil (123) de-energizes, and the jaws (502) moved under the influence of the magnets (501) to operatively engage the threaded portion (144) (a high friction area) of the valve pin assembly (110) by the attractive force of the magnetic holding springs (501) in FIG. 5. Any residual motion of the valve pin assembly (110) is arrested. In this condition, no current is required to hold the valve pin assembly (110) in a gate-closed position, as shown in FIG. 5.

In this position, the valve pin assembly (110) extends through the mold gate (160) and blocks the flow of the molding material through the mold gate (160) (or the mold gate channel).

The next step involves cooling of the moldings in the mold cavity (141), ejecting the molded part from the mold cavity (141) by opening mold (140), and closing the injection mold. The cooling process of plastic parts takes time. Plastic solidification and part removal from the mold cavity (141) is at best five to ten times longer than the time to inject molten material into the mold. Thus, there is a substantial amount of time where the valve pin assembly (110) is resting in a closed position and is de-energized. The mold core portion (140a) and the mold cavity portion (140b) are movable relative to each other, and when the part has solidified, the mold is opened and the part ejected. After ejection, the mold core portion (140a) and the mold cavity portion (140b) are positioned to abut each other so that the mold cavity (141) is formed, and the resin or the molding material may again be injected into the mold cavity (141).

The controller (400) thus energizes coil (104) to retract the pin (110) and the coil (123) to release the jaws (502). The pin (110) is retracted and braked by the current pulse from the controller (400) and the jaws again engaged to hold the pin (110) in the open position.

Thus the mold gate (160) is opened by moving the valve pin assembly (110) upward in the preferred position within the axial stroke of the valve pin assembly (110). The valve pin assembly (110) is designed to open and/or increase the cross-sectional area of the mold gate (160) with the coil bobbin (108) and the pin-locking coil (123) energized, to allow the flow of molten resin into the mold cavity (141).

In some embodiments, the axial stroke can be 8 to 10 mm (millimeters) which is deemed sufficient to avoid adverse effect of the annular flow for most medical moldings and the molding PET preforms.

The LFAA assembly (101) exploits the inherent characteristic of the injection molding process and the hot-runner system (100), where the plastic cooling takes a much longer time in the process than the injection of the polymer the molding material) into the mold cavity (141). Therefore, it is possible to operate the LFAA assembly (101) in a condition of significant current pulse overdrive, limited only by the thermal limitations of the LFAA assembly (101). The method for modulating melt flow within the hot-runner system is obtained by generating a significant axial electrical force for a very short time lasting 5 to 20 ms (milliseconds). In a preferred embodiment, the valve pin assembly (110) moves along the melt flow channel (112) by the LFAA assembly (101) when powered from the current pulse power supply (480). Thus, positioning is accomplished by controlling the pulse current amplitude as a function of time. This allows the actuator operation only during axial movement of the electrical coil (104), leading to reduced operational time within the thermal limitation of the electrical coil (104). During the cooling part of the cycle, the electrical coil (104) is de-energized but locked by the magnetic holding springs (501) of the permanent magnet. The magnetic holding springs (501) rely on magnetic attraction or repulsion to control the force of the locking mechanism. The magnetic holding springs (501) have a significant life and are a very consistent and reliable means of creating a spring force.

It will be noted that no mechanical spring is utilized in the preferred embodiment shown in FIGS. 2 through 10.

Experimentation with and measurements of the embodiments shown demonstrated operational efficiency with the duty cycle of the LFAA assembly (101) up to 25% for an application involving the packaging molding processes, like PET preforms, closures and coffee cap multi-material moldings.

Figure 12:
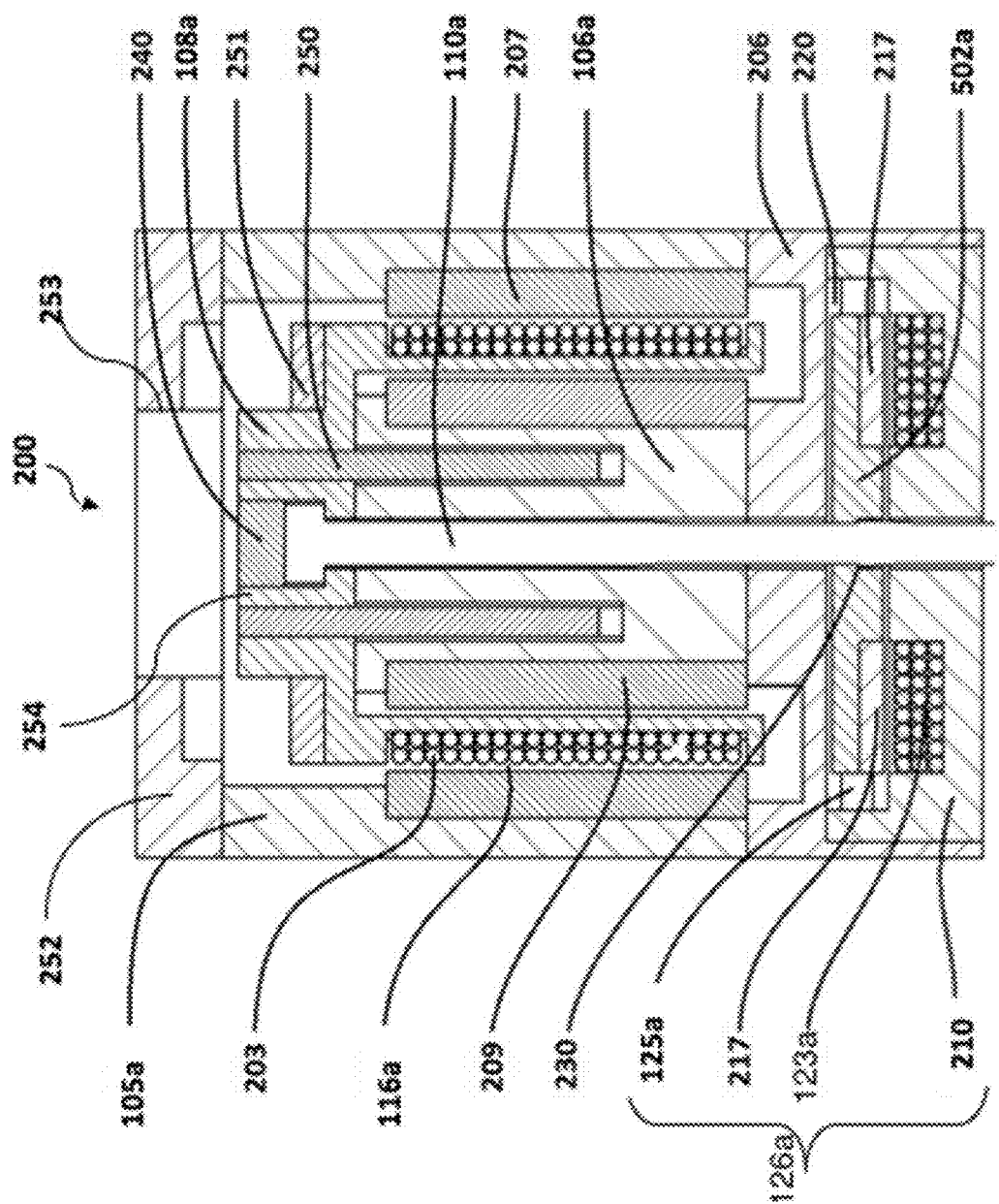
FIG. 12 is an enlarged section similar to FIG. 3 of an alternative embodiment of a Lorentz force actuator assembly.

An alternative embodiment of a Lorentz force actuator assembly is shown in FIG. 12, in which like components are identified by like reference numerals with a suffix "a" for clarity. In the embodiment of FIG. 12, provision is made for enhanced guidance of the pin assembly (110a). Referring therefore to FIG. 12, a Lorentz force actuator assembly (101a) is operatively connected to a valve pin assembly (110a) having a yoke magnetic conductor (105a) and a core magnetic conductor (106a). The core magnetic conductor (106a) and the yoke magnetic conductor (105a) operatively support permanent magnets facing an axial air gap (116a). A yoke permanent magnet assembly and a core permanent magnet assembly (209) are each facing an electrical coil wound as a self-supporting structure or being structurally supported by the coil bobbin (108a). To close the magnetic circuit, a base plate magnetic conductor (206) is provided. The electrical coil (104a), designed to conduct a high current pulse, is placed on the coil bobbin (108a) that is designed to operatively move along the air gap (116a) in the axial direction under an electrical force acting in concert with a permanent magnet field in the air gap (116a), thus creating suitable a condition to generate an electrical force that is perpendicular to the coil current flow and, by definition, in a direction according to polarity of the current pulse. This force is directly and linearly proportional to the current amplitude and increases in the valve pin closing direction.

A pin locking assembly (126a) is positioned at the distal end of a valve pin retainer (240), and the pin locking assembly (126a) operatively arrests any movement of the valve pin assembly (110a) when the electrical locking coil (123a) is de-energized. There is a locking slides air gap (220) between the electrical locking coil (123) and the locking magnet (124a). The pin locking jaws (502a) are guided by the locking slide bearings (125a). When the electrical locking coil (123a) de-energizes, the permanent magnet assembly attracts the two jaws toward each other to close and engage the pin locking rib (230) formed on the pin 110a and to arrest any motion of the valve pin assembly (110a). The pin locking assembly (126a) can be placed along a length of the valve pin assembly (110a), as well as attached to any axially moving part. Magnetic holding springs as shown in FIG. 5 are used for attracting the pin locking jaws (502a) around the valve pin assembly (110a).

Referring now to FIG. 12, once placed in the backup plate (121a), an actuator cover plate (252) is installed. The actuator cover plate (252) is also preferably manufactured from a soft magnetic material. The actuator cover plate (252) has an opening 253 where a valve pin retainer (254) can be guided during the axial movements of the valve pin assembly (110a). This opening can also be used as an access for accurate pin height adjustments. Additionally, the electrical coil bobbin guides (250) are provided to prevent potential side loading on the valve pin assembly (110a) and improve axial motion of the electrical coil (104a). Pin upper position holding magnets (251) are provided for some embodiments to hold the pin (110a) in an open position.

To ensure accurate and precise alignment for the valve pin assembly (110a) and the electrical coil (104a) generating the axial motion, additional guides (250) are incorporated in the bobbin (108a).

Rib (230) is formed as a conical portion of progressively enlarged diameter which thereby provides a radial abutment surface facing the actuator (101a). A number of such ribs may be provided a discreet location on the pin (110a) to provide multiple stable positions.

In use, the jaws (502a) operatively engage the valve pin assembly (110a) through the pin locking rib (230) and are separated as the pin (110) moves toward the closed position by the electrical coil (104a). The coil (123a) I used to separate the jaws (502a) to release the pin (110a) to move to the open position. The electrical locking coil (123a) is placed below a locking magnet to ensure better coil cooling by the backup plate (121 from FIG. 1). The locking magnet may be a permanent magnet.

In the embodiment of FIG. 12 the pin locking assembly (126a) operatively engages the valve pin assembly (110a) against the pin locking rib (230) in a pin closed position. When the valve pin assembly (110a) is in a fully opened position, the pin upper position holding magnets (251) are used as an alternative to bi-directional locking.

Figure 13:
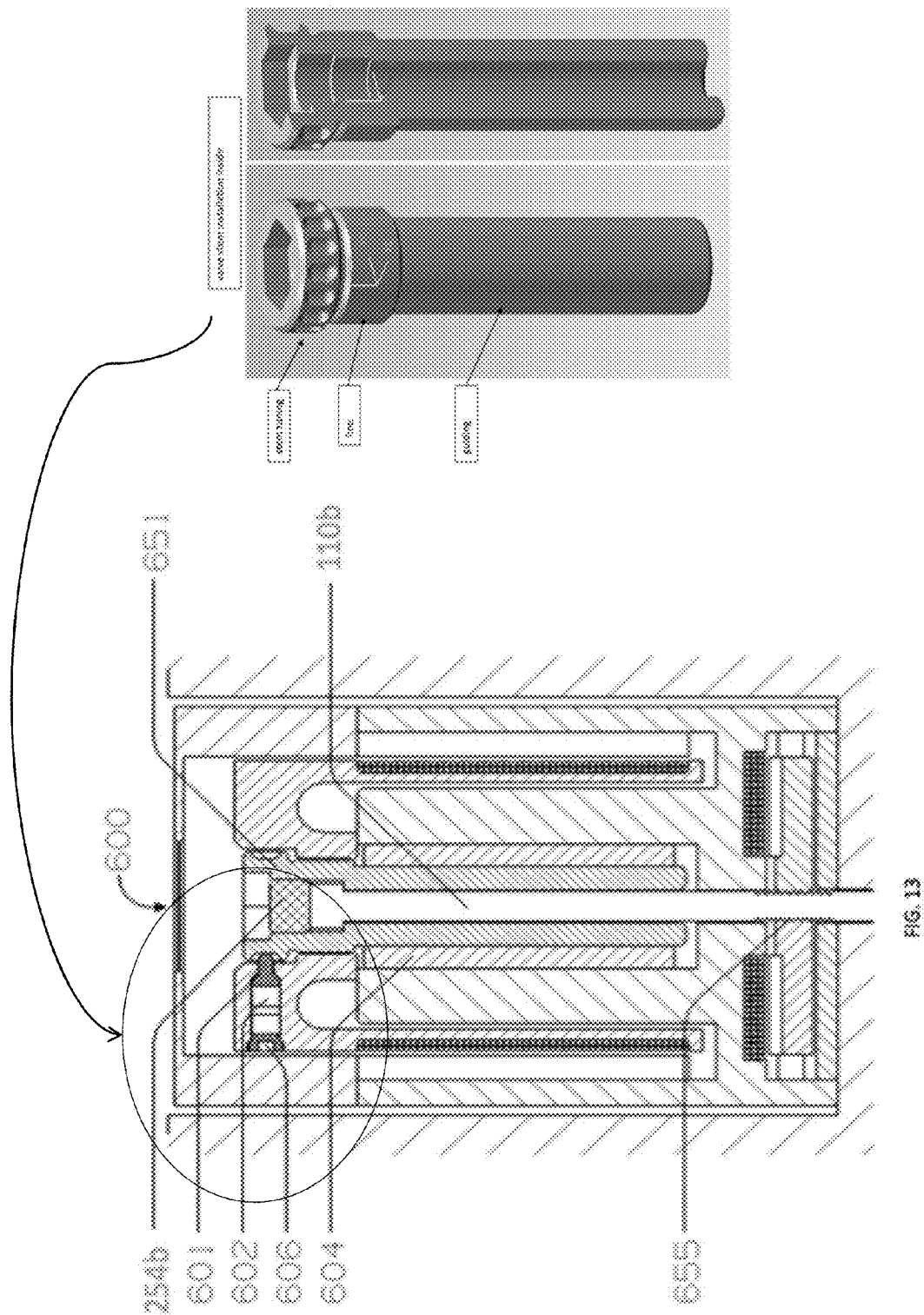
FIG. 13 is a section similar to FIG. 1A showing a further embodiment of a force actuator assembly.
Figure 14:
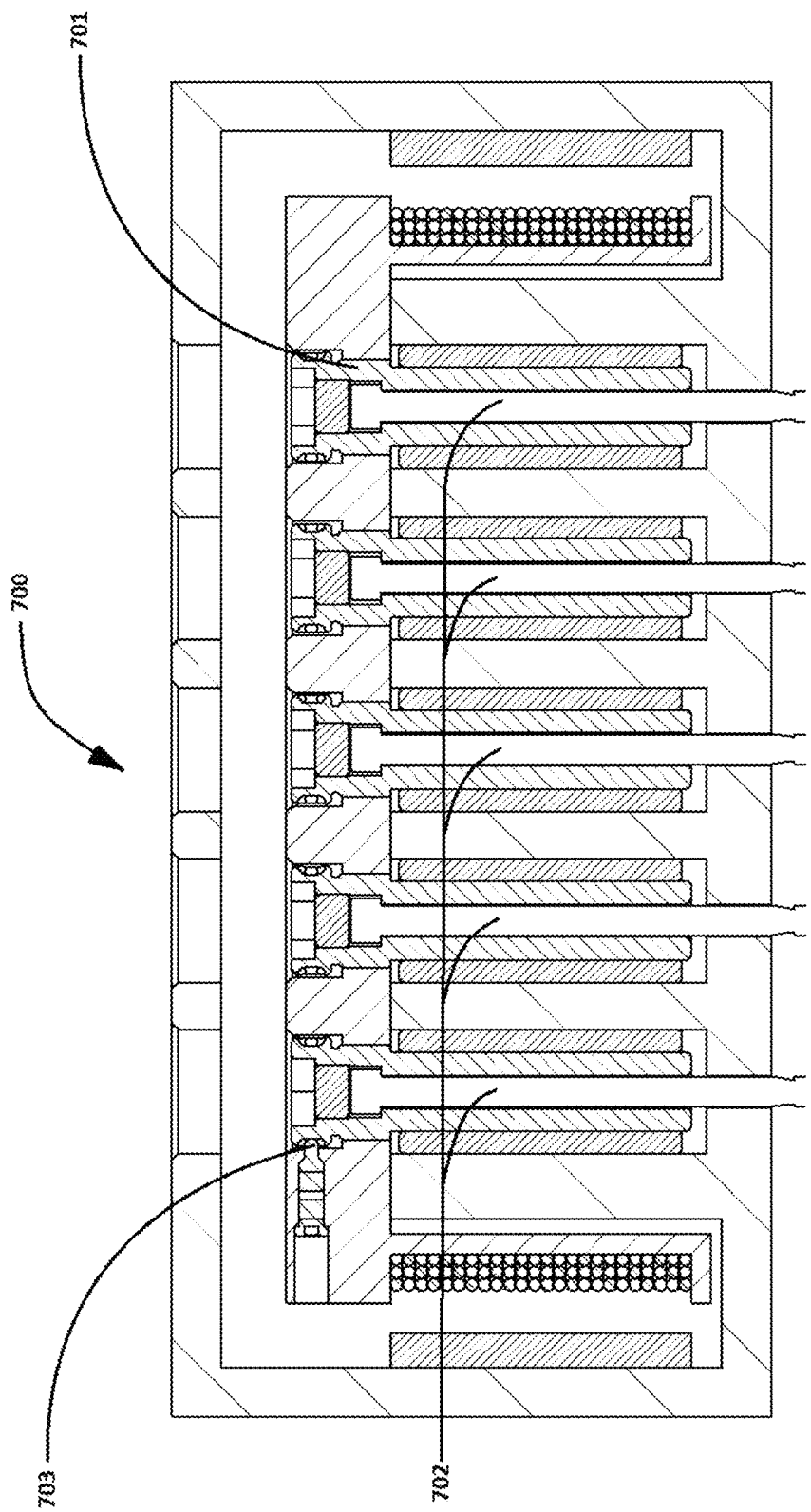
FIG. 14 is a section of the multi-pin array actuator operated by a single Lorentz force actuator assembly of FIG. 1.

A further embodiment is shown in FIG. 13 where like elements are identified with like reference numerals with a suffix "b" for clarity. Referring now to the example of FIG. 13, there is a valve pin retainer (254b) shown at the distal end of the valve pin assembly (110b) with a suitably arranged structure for precise adjustments of the valve pin protrusion, in a form of a valve pin height adjustment assembly (651). A valve pin height adjustment assembly (651) comprises a valve pin guide bushing (604) and a fine-tuning pin indicator providing auditory and visual measure of adjustments in certain "clicks". Each incremental position represents selectively 5 to 25 micrometers of linear movement of the valve pin assembly (110b). The audible "clicks" are generated by the valve pin sound feedback lock (601) in the valve pin adjusting assembly (600) made with the permanent magnet spring (602) shown in FIG. 6. This is a technical structure that will benefit fast service and maintenance of the valve pin assembly (603). A slot (606) is a slot for inserting an adjusting tool for tensioning the magnetic holding springs (501).

As an alternative a method for arresting or locking the axial movement of the valve pin assembly (110), a rotary arrangement using rotary locking slides may be used. This can include a rotating lock using a collet assembly that can effectively maintain the valve pin assembly (110) at rest when the power to the LFAA assembly (101) is turned off.

As a further alternative, a method for arresting or locking the axial movement of the valve pin assembly (110) can be done by utilizing principles of a smart material that changes the volume or the linear dimension by the application of the electrical signal. Some materials of this nature are crystals like quartz, often used to generate and receive a signal. Other well-known materials sensitive to a voltage charge are lead zirconate-titanate or well known as PZT. The science and art of smart materials are replete with materials that can change size by the application of an electrical charge. Material properties like electrostriction, or crystal material matrix reconfiguration, or molecular or particular realignment, are some of the properties of materials like Nitinol, electro rheological fluids or nano-ferofluids, etc.

Since various aspects and structures are possible to use to arrest the movement of the valve pin assembly (110), one example of the preferred arrangement is mentioned, where the valve pin assembly (110) operatively incorporates an electrically-charge sensitive smart material that contracts radially when the electrical signal is applied to opposite axial sides of the smart material (in the form of an insert) to maintain easier axial motion of the valve pin assembly (110). When the signal is not present, the smart material recovers in the normal condition of zero energy state where the majority diameter is larger than the average diameter of the valve pin assembly (110). This may create a friction force against a tightly fitted valve pin assembly (110), and the surrounding coaxial structure may arrest any motion of the valve pin assembly (110). This is a simple and effective way to arrest the axial motion of the valve pin assembly (110) in situations where the mechanical perpendicular obstruction is not desirable for whatever reason. Opposite arrangements, where the contracting ring inner diameter may arrest the movement of the valve pin assembly (110) in position is envisioned.

The invention claimed is:

1. A hot-runner system, comprising:
a melt flow modular assembly having a gate melt flow control apparatus to regulate the flow of material through the melt flow modular assembly, said gate melt flow control apparatus including a valve member movable between a first position in which flow through the melt flow modular assembly is permitted and a second position in which flow is prevented;
an actuator assembly coupled to the gate melt flow control apparatus to effect movement of said valve member, said actuator assembly including:
an electrical conductor and a magnetic assembly, said coil and magnetic assembly being slidable relative to one another in response to current flowing in said conductor;
a controller to regulate a current supplied to the conductor and thereby modulate the force generated between said conductor and magnetic assembly,
one of the electric conductor and the magnetic assembly being coupled to the gate melt flow control apparatus to effect movement of the valve member between said first position and said second position in response to current supplied to said conductor
and a retractable locking assembly configured to engage the valve member to inhibit movement thereof, and, upon retraction, to release the valve member to permit movement thereof.

2. The hot-runner system of claim 1, wherein:
said valve member includes a valve in assembly.

3. The hot-runner system of claim 2, wherein: the valve in assembly is moveable in the axial direction between said first position and second position.

4. The hot-runner system of claim 2 wherein the electrical conductor is a coil coupled to said valve in assembly.

5. The hot-runner system of claim 1, wherein:
said retractable locking assembly is biased to engage the valve member to inhibit movement thereof and releases said valve member upon supply of electrical current to said conductor.

6. The hot-runner system of claim 5, wherein:
the melt flow modular assembly includes an injection nozzle;
the valve member includes a valve pin assembly slidable in the injection nozzle, and the valve pin assembly being interactive with a mold gate;
the actuator assembly is coupled to the valve pin assembly; and
the locking assembly is configured to engage the valve pin assembly to inhibit movement thereof.

7. The hot-runner system of claim 1, wherein:
the magnetic assembly of the actuator assembly includes:
a core permanent magnet assembly defining an air gap;
a yoke magnetic assembly being positioned on a first side of the air gap; and
a core magnetic assembly being positioned on a second side of the air gap opposite to the yoke magnetic assembly.

8. The hot-runner system of claim 7, wherein:
the actuator assembly further includes:
a coil bobbin movable along the air gap, the coil bobbin connected to the gate melt flow control apparatus; and
the electrical conductor is a coil supported by the coil bobbin,
wherein, in response to energization of the electrical coil by the current and interaction between the electrical coil and said the yoke magnetic assembly and the core magnetic assembly, the electrical coil moves the coil bobbin and the gate melt flow control apparatus.

9. The hot-runner system of claim 1, wherein:
said valve member includes a valve in assembly, and
the actuator assembly includes:
at least one electrical coil guides to prevent side loading on said valve pin assembly to facilitate relative motion between the electrical coil and the magnetic assemblies of the actuator assembly.

10. The hot-runner system of claim 2, wherein said valve in assembly includes a valve pin, a seat engaged by said pin in said second position, and,
a valve pin retainer for retaining said valve pin assembly and having a valve pin height adjustment assembly for adjustments of a valve pin relative to said seat.

11. The hot-runner system of claim 10, wherein:
the valve pin height adjustment assembly includes:
a valve pin guide bushing; and
a fine-tuning pin indicator providing auditory and visual measure of adjustments.

12. The hot-runner system of claim 1, wherein:
the actuator assembly is configured to operate a multi-pin array actuator.

13. A hot runner system according to claim 5 wherein the locking assembly has:
- at least one pin-locking slide able to engage the valve member, each pin-locking slide having a permanent magnet;
- an electrical pin-locking coil operatively engaged with the permanent magnet of the pin-locking slide wherein energizing the pin-locking coil causes the magnet to apply a force to the pin-locking slide such that the pin-locking slide disengages the valve member to permit movement, and de-energizing the pin-locking coil allows the pin-locking slide to engage the locking member and inhibit further movement thereof.

14. The hot-runner system of claim 13, wherein:
the locking assembly further comprising:
magnetic holding springs; and
lock slide guides;
the at least one pin-locking slide capable of moving along the lock slide guides under force of the magnetic holding springs to engage said valve member;
said valve member having a pin-locking feature to which the pin-locking slide can engage such that engagement between the pin-locking slide and the pin-locking feature maintains the position of the valve member when operating power from the actuator assembly is removed;
the electrical coil of the actuator assembly and the pin-locking coil are positioned relative to one another such that when the electrical coil of the actuator assembly is energized, it interacts with the permanent magnets of the pin-locking slide, to disengage the pin-locking slide from the valve member.

15. The hot-runner system of claim 14, wherein:
said valve member is a valve in assembly having a valve in axially moveable by said-actuator and said in locking slides are restrained for movement transverse to said valve in by said lock slide guides to engage said valve pin, whereby, when the pin-locking coil and the electrical coil are energized the at least one pin-locking slide moves to disengage the valve in assembly and permit movement of the valve pin.

16. The hot-runner system of claim 15, wherein:
the pin-locking feature is located around a circumference of the valve pin; and
the pin-locking feature is positioned at a distance from a distal end of the valve pin assembly, and is located in an axial position of the locking assembly.

17. The hot-runner system of claim 13, wherein:
the locking assembly includes:
- a locking rib extending along a valve pin assembly of the valve member in the direction of the stroke length of the actuator assembly and the locking rib being configured to be engaged by the pin-locking slide to maintain the position of the valve in assembly.

18. The hot-runner system of claim 5, wherein:
the locking assembly includes:
pin-locking slides; and
magnetic holding springs that act to apply a force to the at least one pin-locking slides in the direction of engaging the pin-locking slide with the gate melt flow control apparatus.

19. The hot-runner system of claim 1, wherein:
the actuator assembly is configured to:
operate the gate melt flow control apparatus to modulate plastic melt flow through the melt flow modular assembly.

20. The hot-runner system of claim 5, wherein:
the locking assembly is an electrically powered locking assembly to maintain a position of said valve member; and operatively coupled to the actuator assembly, such that when the actuator assembly is de-energized, the electrically powered locking assembly maintains the position of the valve member; and
no electrical power is used by the actuator assembly when the position of the valve member is maintained by the locking assembly.

21. The hot-runner system of claim 1, wherein:
the magnetic assembly of the actuator assembly includes:
a yoke magnetic conductor, and
a core magnetic conductor.

22. The hot-runner system of claim 21, wherein:
the core magnetic conductor and the yoke magnetic conductor are positioned to support one or more permanent magnets, such that the one or more permanent magnet is facing an air gap.

23. The hot-runner system of claim 21, wherein:
the magnetic assembly of the actuator assembly further includes:
a yoke permanent magnet assembly facing the electrical coil;
a core permanent magnet assembly facing the electrical coil; and
a coil bobbin supporting the electrical coil, and the coil bobbin operatively moves along an air gap in an axial direction under an electrical force acting in concert with a permanent magnet field in the air gap, creating a condition to generate the electrical force that is perpendicular to a coil current flow and in a direction according to polarity of a current pulse passing through the electrical coil.

24. The hot-runner system of claim 21, wherein:
the actuator assembly further includes:
a yoke magnetic assembly and a core magnetic assembly operatively connected to make up an uninterrupted closed magnetic circuit for magnetic induction from permanent magnets to pass perpendicularly through an air gap located between the core magnetic assembly and the yoke magnetic assembly, and over the electrical coil of the actuator assembly.

25. The hot-runner system of claim 21, wherein:
the magnetic assembly creates a uniform magnetic field in a magnetic air gap so that force due to the actuator assembly acts in an axial direction and is centered to drive a valve pin assembly of the gate melt flow control apparatus axially along a melt flow channel in such a way as not to impart any side forces on the valve pin assembly.

26. The hot-runner system of claim 21, wherein:
the magnetic assembly of the actuator assembly includes:
a core magnetic assembly;
a yoke magnetic assembly; and
the electrical coil is wound onto a coil bobbin positioned at an interior annular space between the core magnetic assembly and the yoke magnetic assembly, and the coil bobbin is free to move along a magnetic air gap.

27. An injection plastic molding apparatus devised to mold plastic articles;
the infection molding apparatus comprising:
a melt flow modular assembly having a gate melt flow control apparatus to regulate the flow of material through the melt flow modular assembly, said gate melt flow control apparatus including a valve member movable between a first position in which flow through the melt flow modular assembly is permitted and a second position in which flow is prevented;

an actuator assembly coupled to the gate melt flow control apparatus to effect movement of said valve member, said Lorentz force actuator assembly including:

an electrical coil and a magnetic assembly having a permanent magnet, said coil and magnetic assembly being slidable relative to one another in response to current flowing in said coil;

a controller to regulate a current supplied to the coil and thereby modulate the force generated between said coil and magnetic assembly, one of the electric coil and the magnetic assembly being coupled to the gate melt flow control apparatus to effect movement of the valve member between said first position and said second position in response to current supplied to said coil.

28. A method for controlling a gate melt flow control apparatus of a hot runner system, the hot runner system comprising a melt flow modular assembly having a gate melt flow control apparatus to regulate the flow of material through the melt flow modular assembly, said gate melt flow control apparatus including a valve member movable between a first position in which flow through the melt flow modular assembly is permitted and a second position in which flow is prevented;

an actuator assembly coupled to the gate melt flow control apparatus to effect movement of said valve member, said actuator assembly including:

an electrical coil and a permanent magnet, said coil and permanent magnet being slidable relative to one another in response to current flowing in said coil;

a controller to regulate a current supplied to the coil and thereby modulate the force generated between said coil and permanent magnet, one of the electric coil and the permanent magnet being coupled to the gate melt flow control apparatus to effect movement of the valve member between said first position and said second position in response to current supplied to said coil from the controller wherein the method includes the steps of monitoring the position of the valve member in the second position, providing data indicative of the position to said controller, implementing iterative learning control mathematical algorithms in the controller to control the output force of the actuator assembly to facilitate Positioning of the valve member in said second position.

29. The method of claim 28 further including the step of using x-ray or suitable ionizing or non-ionizing electromagnetic waves to monitor the position of said valve member and obtain real-time feedback to further control the output force of the actuator assembly to maintain the Positioning of the valve member in a close loop manner.

30. A flow control apparatus including a valve member to regulate flow and an actuator to operate said valve member, wherein the actuator assembly comprises:

an electrical coil and a magnetic assembly having a permanent magnet, said coil and magnetic assembly are slidably engaged wherein one of the electrical coil or permanent magnet assembly is slidable and the other relatively fixed;

wherein the slidable one of the electric coil or permanent magnet is coupled to the valve member;

a controller to regulate a current supplied to the coil includes a capacitor; and wherein the electric coil and permanent magnet-interact to generate a force that moves the valve member between the first position and the second position, such that the generated force is modulated by modulating the current in the coil.

* * * * *